United States Patent
Feder et al.

(10) Patent No.: US 6,781,985 B1
(45) Date of Patent: Aug. 24, 2004

(54) TIME-DIVISION MULTIPLEXER

(75) Inventors: Peter James Feder, Hawthorn East (AU); Shoichi Sageshima, Kawasaki (JP); Takashi Nagato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 738 days.

(21) Appl. No.: 09/624,666

(22) Filed: Jul. 25, 2000

(30) Foreign Application Priority Data

Aug. 2, 1999 (JP) .......................................... 11-218752

(51) Int. Cl.[7] .............................................. H04L 12/50
(52) U.S. Cl. ........................ 370/376; 370/535; 370/536
(58) Field of Search ................................ 370/360, 362, 370/364, 366, 375, 376, 442, 535, 536, 537, 538, 539

(56) References Cited

U.S. PATENT DOCUMENTS

| | | | |
|---|---|---|---|
| 4,787,081 A | * 11/1988 | Waters et al. ............... | 370/438 |
| 4,987,591 A | * 1/1991 | Ohtsuka ..................... | 379/279 |
| 5,161,152 A | * 11/1992 | Czerwiec et al. .......... | 370/463 |
| 5,260,937 A | * 11/1993 | Eames et al. ............... | 370/376 |
| 5,345,442 A | * 9/1994 | Sato .......................... | 370/376 |
| 5,594,727 A | * 1/1997 | Kolbenson et al. ......... | 370/442 |
| 5,848,065 A | 12/1998 | Gorshe et al. | |

FOREIGN PATENT DOCUMENTS

GB         2185659 A     7/1987

OTHER PUBLICATIONS

"Dynamic Time Slot Assignment Architecture for a Digital Telephone Switch", Jun. 1987, IBM Technical Disclosure Bulleten.*

* cited by examiner

Primary Examiner—Chau Nguyen
Assistant Examiner—Soon-Dong Hyun
(74) Attorney, Agent, or Firm—Katten Muchin Zavis Rosenman

(57) ABSTRACT

Disclosed is a time-division multiplexer for demultiplexing, into individual time slots, time-division multiplexed data in a receive direction received from a network via a trunk unit, and sending the data to a prescribed tributary unit, and for multiplexing, to a prescribed time slot, data in a transmit direction which enters from tributary units and sending the data to the network via the trunk unit. The time-division multiplexer has a trunk bus to which a trunk unit is connected and a tributary bus to which tributary units are connected, and a time-slot interchange unit provided between these buses, wherein interchange of cross-connected time slots on the trunk side and time slots on the tributary side is performed dynamically by the time-slot interchange unit. Further, a common channel signaling controller is provided between the bus lines, wherein the common channel signaling controller performs control for dynamic assignment of time slots and sends a time-slot exchange request to the time-slot interchange unit.

7 Claims, 20 Drawing Sheets

FIG.11A

RECEIVE LOCATION TABLE — RLT

| PORT NO. | CARD NUMBER | TRIBUTARY BUS HIGHWAY NO. | TIME SLOT IN HIGHWAY |
|---|---|---|---|
| 1 | ... | ... | ... |
| 2 ⋮ | : | : | : |
| N | ... | ... | ... |

FIG.11B

RECEIVE TIME SLOT – PORT CORRESPONDENCE TABLE — RTP

| HIGHWAY NO. | TIME SLOT | ASSIGNED PORT NO. |
|---|---|---|
| hwy0 | TS0 | |
| | TS1 | |
| | ⋮ | ⋮ |
| | TS31 | |
| hwy1 ⋮ | ⋮ | ⋮ |
| hwy31 | TS0 | |
| | TS1 | |
| | ⋮ | ⋮ |
| | TS31 | |

FIG.11C

TRANSMIT LOCATION TABLE — SLT

| PORT NO. | CARD NUMBER | TRIBUTARY BUS HIGHWAY NO. | TIME SLOT IN HIGHWAY |
|---|---|---|---|
| 1 | ... | ... | ... |
| 2 ⋮ | : | : | : |
| N | ... | ... | ... |

FIG.11D

TRANSMIT TIME SLOT – PORT CORRESPONDENCE TABLE — STP

| HIGHWAY NO. | TIME SLOT | ASSIGNED PORT NO. |
|---|---|---|
| hwy0 | TS0 | |
| | TS1 | |
| | ⋮ | ⋮ |
| | TS31 | |
| hwy1 ⋮ | ⋮ | ⋮ |
| hwy31 | TS0 | |
| | TS1 | |
| | ⋮ | ⋮ |
| | TS31 | |

TIME-DIVISION MULTIPLEXER

BACKGROUND OF THE INVENTION

This invention relates to a time-division multiplexer and, more particularly, to a time-division multiplexer having a time-division bus structure equipped with two independent buses which transport time-division multiplexed data, and a time-slot assignment unit which freely interchanges time slots between buses, wherein the buses are capable of being connected to each other via the time-slot assignment unit.

The present invention relates to a time division multiplexer based upon a 64 Kbps PCM structure and is applicable under the V5.2 protocol. A number of international and national standards bodies provide recommendations and standards for a common interface and coding between time-division multiplexers. One such body is the International Telecommunication Union, which publishes a large number of recommendations under the ITU-T standardization sector. An ITU-T publication G.797 contains many recommendations relating to types of services, interfaces and performance aspects that the time-division multiplexer should support. However, ITU-T G.797 does not define the means for implementing the equipment and leaves this to the manufacturer.

The present invention concerns the implementation of time-division multiplexers. A favorable application of time-division multiplexers is to extend the range of digital switching systems by using remote time-division multiplexers connected by fiber-optic cables. To minimize the overall capacity in the fiber-optic cable and maximize the number of services offered, a level of concentration is employed. Concentration is on a first-come first-served basis. When trunk capacity is reached, the next service requesting a circuit switched connection will be refused. A particular signaling standard being adopted by digital switching systems and time-division multiplexers is the ETSI V5.2, which is a common channel signaling standard.

A time-division multiplexer is composed of a group of units mounted at right angles on a back wiring board (BWB). As shown in FIG. 18, the time-division multiplexer has a plurality of tributary units TRB1–TRBn, at least one trunk unit TRU and a time-slot assignment unit TSA for assigning time slots.

The trunk unit TRU operates as an optical interface when time-division data or a signaling message is exchanged with another time-division multiplexer via an optical fiber OFB. The tributary units TRB1–TRBn operate as service interfaces for connecting subscribers or customer terminals, convert the format of time-division multiplexed data in such a manner that the data will suit the customer interface, and send/receive data and signaling messages to and from lines $L_1$ to $L_N$. The time-slot assignment unit TSA time-division multiplexes N-channel data and demultiplexes data that has been time-division multiplexed. Connected to the tributary units TRB1–TRBn are, by way of example, a 64 Kbps telephone line, a 2B+D (144 Kbps) ISDN basic rate line, an ISDN primary rate line, a 64 Kbps analog leased line and a X2.1 line of N·64 Kbps, etc.

FIG. 19 is a block diagram of a network which employs time-division multiplexers as digital subscriber line (DSL) equipment. A time-division multiplexer DSL-R on the subscriber side accommodates subscribers on N channels, time-division multiplexes the data on the N channels and sends the multiplexed data to a time-division multiplexer DSL-C on the trunk side via a digital transmission line (optical fiber) OFB. The time-division multiplexer DSL-C on the trunk side demultiplexes the time-division multiplexed data into N channels and inputs the data to an exchange EXC. Further, the time-division multiplexer DSL-C on the trunk side time-division multiplexes N-channel data from the exchange EXC and sends the multiplexed data to the time-division multiplexer DSL-R on the subscriber side. The latter then demultiplexes this time-division multiplexed data to N channels and sends the data to the subscribers.

FIG. 20 illustrates the manner in which a time-division multiplexer is utilized as an access network unit for accessing an SDH network. Here SDHN represents a ring-shaped SDH network, AN an access network unit, FLX an SDH interface unit and LE a local exchange. The access network unit AN time-division multiplexes N-channel data, sends this time-division multiplexed data to the SDH network SDHN via optical fiber OFB, demultiplexes multiplexed data from the SDH network SDHN and sends the demultiplexed data to the subscriber side.

FIG. 21 is a diagram showing the structure of a frame applied under ITU-T G.704. Here one frame is composed of 32 time slots and one multiframe is composed of 16 frames. The duration of one frame is 125 $\mu$s and the duration of one multiframe is 2 ms. The starting time slot of each of even-numbered frames (F0, F2, . . . , F14) is used as a sync time slot, and the starting time slot of each of odd-numbered frame (F1, F3, . . . , F15) is used for transmission of a predetermined signal (alarm, a particular pattern for CRC, etc.). Further, the $16^{th}$ time slot of the $0^{th}$ frame (F0) is used for multiframe alignment, and the $16^{th}$ time slot of each of the remaining frames (F1, F2, . . . , F15) is used for communication of signaling messages. Since two channel's worth of signaling messages are transmitted by a single $16^{th}$ time slot (eight bits), 30 channel's worth of signaling messages can be transmitted by a single multiframe. In other words, a signaling message is sent/received every 2 ms. A signaling message is for communicating the state of a telephone, such as on-hook, off-hook, ringing, etc.

The conventional time-division multiplexer assigns predetermined time slots to specific subscribers in a static manner. This means that if the maximum number of multiplexed channels of a digital transmission line is N, then subscribers on more than N channels cannot be accommodated. If an attempt is made to accommodate a larger number of subscribers with a low level of concentration, a problem that arises is an increase in the size of the equipment. Another problem with the conventional time-division multiplexer is difficulty in upgrading. For these reasons, there is demand for a time-division multiplexer that is capable of handling subscribers beyond the capacity of the transmission line and that can be upgraded with ease.

A further problem with the conventional time-division multiplexer is that each unit can be inserted only at a predetermined position on the back wiring board. This can lead to insertion at the wrong position and makes the insertion operation a troublesome one.

SUMMARY OF THE INVENTION

Accordingly, an object of the present invention is to provide a time-division multiplexer that is capable of handling subscribers beyond the capacity of a transmission line and that can be upgraded with ease.

Another object of the present invention is to provide a time-division multiplexer in which each unit can be inserted at any position on a back wiring board.

A further object of the present invention is to provide a time-division multiplexer having a function for giving notification of the congested state.

According to the present invention, the foregoing objects are attained by providing a time-division multiplexer having a trunk bus to which a trunk unit is connected and a tributary bus to which tributary units are connected, and a time-slot interchange unit provided between these buses, wherein interchange of time slots on the trunk side and time slots on the tributary side is performed dynamically by the time-slot interchange unit. Further, a common channel signaling controller is provided between the bus lines, wherein the common channel signaling controller performs control for dynamic assignment of time slots and sends a time-slot exchange request to the time-slot interchange unit.

By way of example, in the receive direction, the common channel signaling controller (1) obtains a vacant time slot of a receive tributary bus and adopts this time slot as a time slot $T_B$ on the tributary side; (2) sends a request for interchange of a time slot $T_A$ on the trunk side and the time slot $T_B$ on the tributary side to the time-slot interchange unit via a control bus; and (3) notifies a tributary unit of the time slot $T_B$ on the tributary side via the control bus; the time-slot interchange unit (4) interchanges the data in the time slot $T_A$ on the trunk side with that in the time slot $T_B$ on the tributary side based upon the time-slot interchange request; and the tributary unit (5) accepts data from the receive tributary bus at the timing of the notified time slot $T_B$.

Further, in the transmit direction, the common channel signaling line (1) obtains a vacant time slot of a transmit tributary bus and adopts this time slot as a time slot $T_A'$ on the tributary side; (2) sends a request for interchange of the time slot $T_A'$ on the tributary side and a time slot $T_B'$ on the trunk side to the time-slot interchange unit; and (3) notifies a tributary unit of the time slot $T_A'$ on the tributary side; the time-slot interchange unit (4) interchanges the data in the time slot $T_A'$ on the tributary side with that in the time slot $T_B'$ on the trunk side based upon the time-slot interchange request; and the tributary unit (5) sends data to the transmit tributary bus at the timing of the notified time slot $T_A'$.

Further, the common channel signaling controller (1) assigns a vacant time slot $T_D$ of a receive tributary bus to a call generated at the time of congestion; (2) sends a time-slot interchange unit a dynamic interchange request for interchanging a congestion-message send time slot $T_C$ and the time slot $T_D$; and (3) notifies a tributary unit of the time slot $T_D$ on the tributary side; the time-slot interchange unit (4) interchanges a congestion message in a time slot $T_C$ on the trunk side with the time slot $T_D$ on the tributary side based upon the interchange request; and the tributary unit (5) accepts the congestion message from the receive tributary bus at the timing of a designated time slot $T_D$.

If the arrangement described above is adopted, it is unnecessary to assign time slots to subscribers in a static manner. Communication can be achieved while assigning vacant time slots to subscribers dynamically, thereby making it possible to accommodate subscribers beyond the capacity of a transmission line.

Moreover, control for interchanging time slots can be performed in a short period of time and upgrading is simplified.

Further, since time slots are assigned dynamically, units such as trunk units and tributary units can be inserted at any positions on a back wiring board. In addition, the congested state of a time-division multiplexer can be reported to the subscriber, thereby making it possible to improve service.

Other features and advantages of the present invention will be apparent from the following description taken in conjunction with the accompanying drawings.

BRIEF DESCRIPTION OF THE DRAWINGS

FIGS. 11A, 11B, 11C and 11D are diagrams useful in describing various tables;

DESCRIPTION OF THE PREFERRED EMBODIMENTS (A) Overview of the present invention

Figure 1:
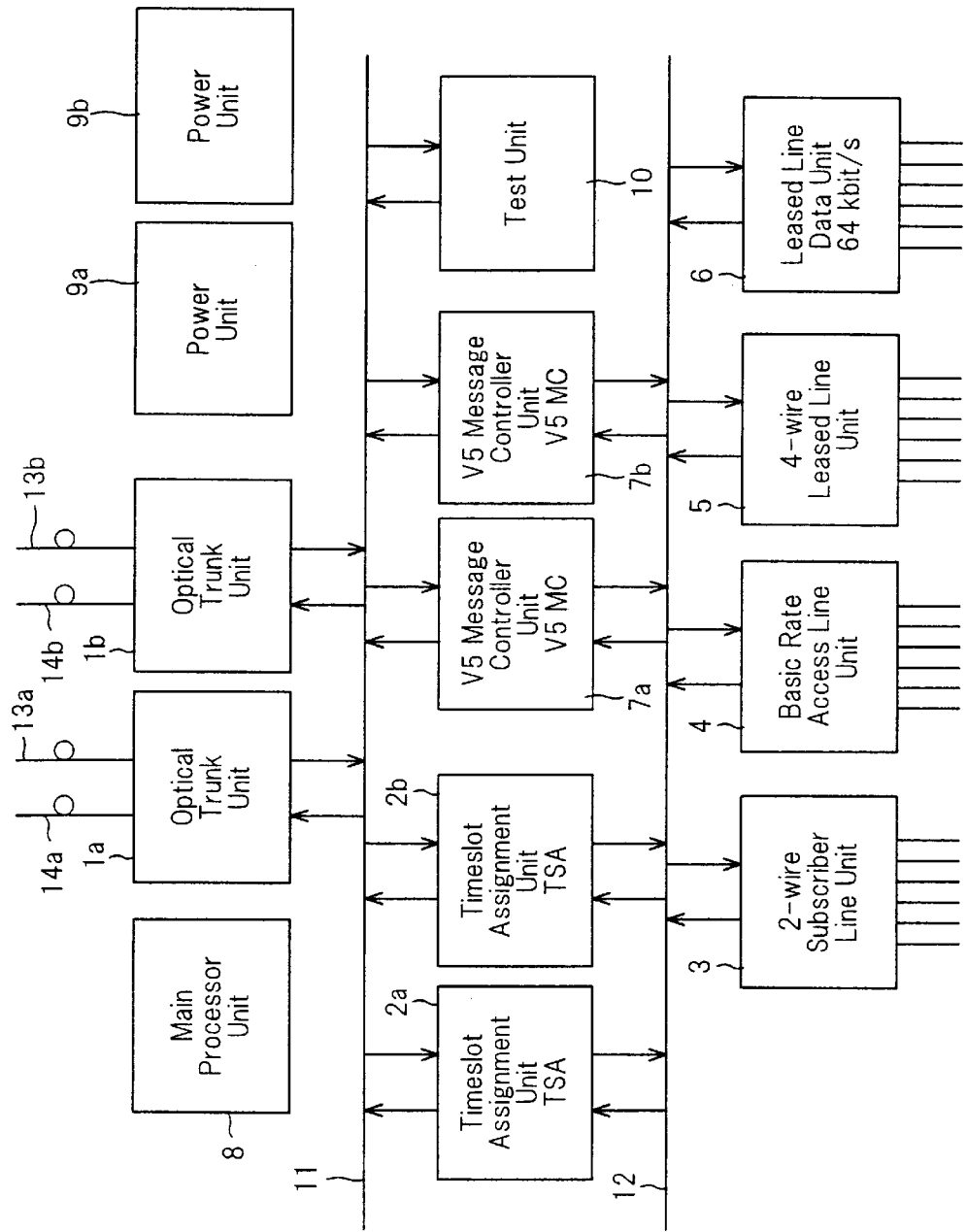
FIG. 1 is a block diagram showing the flow of main signals in a time-division multiplexer according to the present invention.
Figure 2:
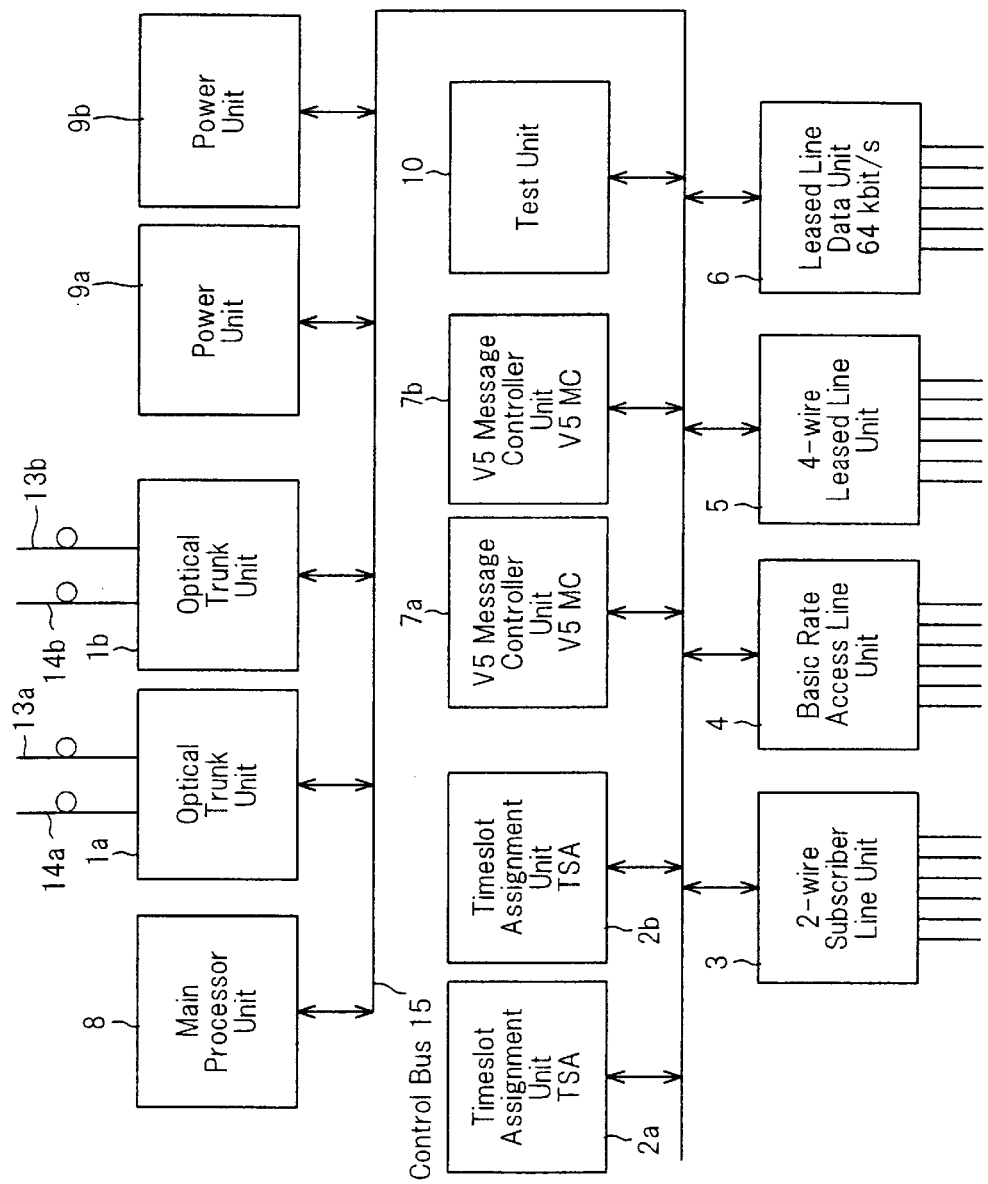
FIG. 2 is a block diagram showing the flow of control signals in the time-division multiplexer of the present invention.

FIGS. 1 and 2 are block diagrams illustrating the overall structure of a time-division multiplexer according to the present invention, in which FIG. 1 shows the flow of main signals and FIG. 2 the flow of control signals.

The time-division multiplexer consists of a set of units 1a to 10 mounted at right angles on a back wiring board (BWB). The exchange of time-division multiplexed data and signaling messages between units is performed via one set of parallel buses 11, 12 formed on the BWB, and control signals are exchanged via a control bus 15 (see FIG. 2) similarly formed on the BWB. A trunk bus 11 is used for the exchange of time-division multiplexed data and signaling messages between an optical trunk unit 1a and a time-slot assignment unit (TSA) 2a. A tributary bus 12 is used for the exchange of time-division multiplexed data and signaling messages between the time-slot assignment unit 2a and each of tributary units 3, 4, 5 and 6.

The optical trunk unit 1a operates as an optical interface when time-division multiplexed data and signaling messages on the trunk bus 11 are exchanged with another time-division multiplexer via optical fibers 13a, 14a.

The time-slot assignment unit 2a acts as a time-slot interchange cross-connect switch. That is, the time-slot assignment unit 2a operates as a cross-connect switch for the interchange of time slots between the trunk bus 11 and the tributary bus 12.

The tributary units 3, 4, 5, 6 act as service interfaces for connecting subscribers or terminal equipment. The tributary units 3 to 6 perform a format conversion between user data and time-division multiplexed data and implement exchange of time-division multiplexed data and signaling messages between the tributary bus 12 and subscriber circuits or terminal equipment. The tributary units are a 2-wire subscriber line unit 3, a basic rate access line unit (2B+D ISDN unit) 4, a 4-wire leased line unit 5 and a leased line data unit 6.

A V5 message controller (V5MC) 7a acts as a message controller for converting subscriber signaling messages to common channel signaling messages in accordance with the V5.1 or V5.2 protocol. Other units which are provided are a main processor unit 8, a power unit 9a and a test unit 10.

The trunk bus 11 and tributary bus 12 are provided on the BWB in such a manner that the locations of the units 1a, 2a, 3, 4, 5, 6 and 7a are position-independent.

The optical trunk unit, time-slot assignment unit (TSA), V5 message controller (V5MC) and power unit are dual-redundant so that protect units 1b, 2b, 7b and 9b will back up the working units 1a, 2a, 7a and 9a, respectively.

Thus, the present invention provides three internal bus structures in order to furnish an interconnection among the circuit units that construct the time-division multiplexer.

The internal-bus structure is such that the buses have the following functions:

(1) The trunk bus 11 provides for the exchange of time-division multiplexed data and channel-associated signaling messages (CAS messages) between the optical trunk unit 1a and the time-slot assignment unit 2a.

(2) The tributary bus 12 provides for the exchange of time-division multiplexed data and CAS messages between the tributary units 3 to 6 and the time-slot assignment unit 2a.

(3) The control bus 15 provides for the exchange of control signals and alarm signals between all units and the main processor unit 8.

(4) The control bus 15 additionally provides for the exchange of V5 signaling messages between the tributary units which support the V5 protocol and the V5 message controller 7a.

(5) The control bus 15 additionally provides for the exchange of V5 alarm information between the trunk unit 1a which supports the V5 protocol and the V5 message controller 7a.

(6) The control bus 15 additionally provides for the exchange of dynamic assignment information (time-slot interchange information) and deletion information between the V5 message controller 7a and the time-slot assignment unit 2a.

(7) The three buses 11, 12 and 15 can appear connectably at all circuit-unit insertion positions on the BWB.

(8) The optical trunk unit 1a is capable of being located at any position on the BWB. In this case, the connector is designed in such a manner that if the optical trunk unit 1a is inserted into a slot at any position on the BWB, it will be connected only to the trunk bus 11 and control bus 15. Further, the connector is designed in such a manner that if the V5 message controller 7a or time-slot assignment unit 2a is inserted into any slot on the BWB, these units will be connected to all of the buses, namely the trunk bus 11, tributary bus 12 and control bus 15. Further, the connectors are designed in such a manner that if the tributary units 3 to 6 are inserted into slots at any positions on the BWB, these tributary units will be connected only to the tributary bus 12 and control bus 15.

(9) The tributary units 3 to 6 support many types of services and time slots the number of which is associated with these services.

(10) The signaling schemes supported via the three buses 11, 12 and 15 are (a) no signaling and (b) channel-associated signaling messages (CAS messages) or V5 signaling messages. At locations where V5 signaling messages are used, CAS messages are ignored. Dynamic assignment control of time slots according to the present invention employs V5 signaling messages.

(B) Frame structure

Figure 3:
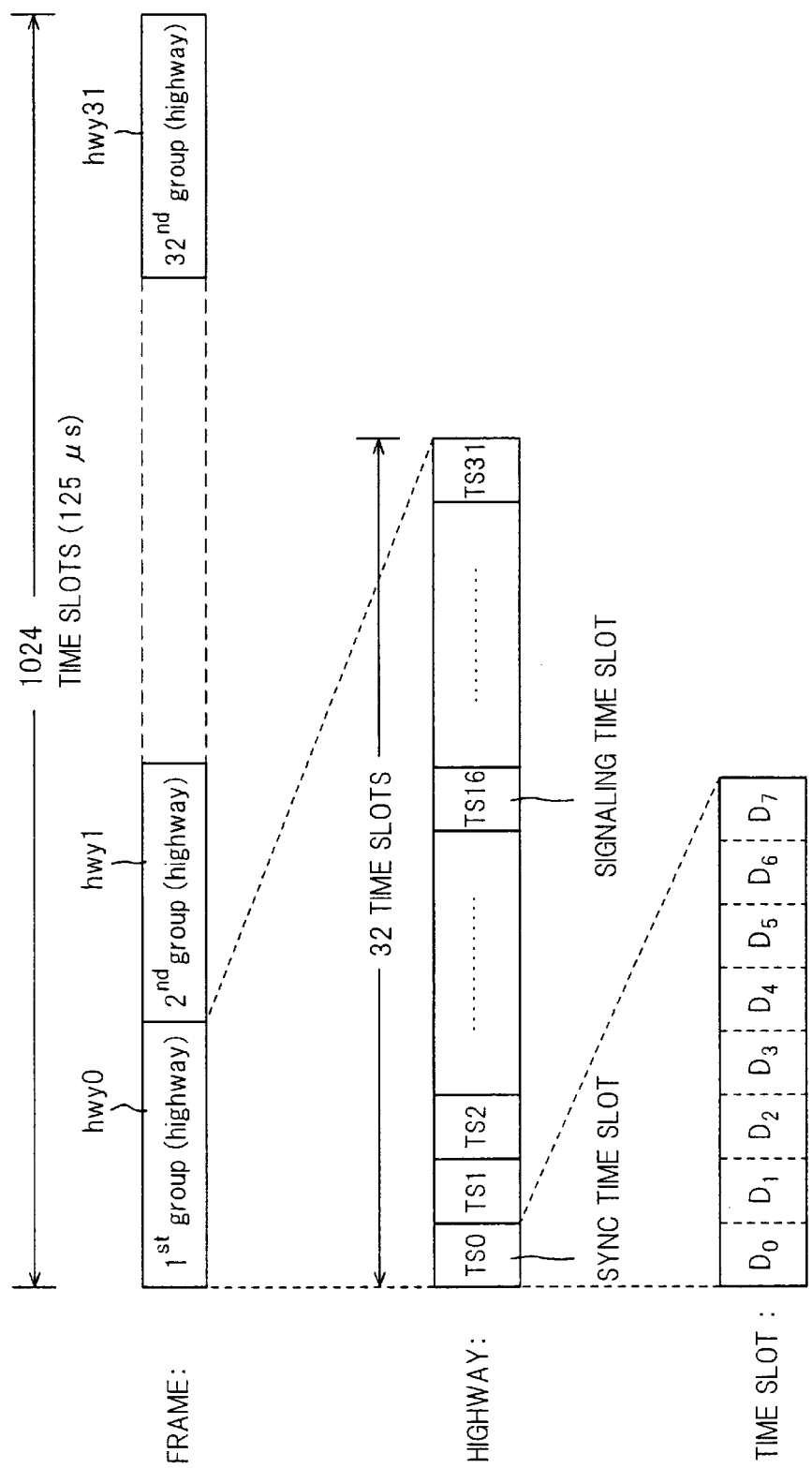
FIG. 3 is a diagram useful in describing the structure of a frame.

FIG. 3 is a diagram of frame structure according to the present invention. Here one frame is constructed by 1024 time slots and one group (highway) is formed by 32 time slots. Accordingly, one frame is composed of a total of 32 highways from a $1^{st}$ highway hwy0 to a $32^{nd}$ highway hwy31. Each of the time slots TS0 to TS31 is composed of eight bits $D_0$ to $D_7$.

Since one frame is equivalent to 125 $\mu$s, the bit rate on a transmission line $(1024 \times 8)/(125 \times 10^{-6})$–65.536 Mbps, the bit rate for every group (highway) is 2.048 Mbps, and the frequency of the time slots is 8.192 MHz.

The leading time slot TS0 of each highway is used as a sync time slot and the $16^{th}$ slot TS16 is a signaling time slot and is used as time slot for CAS message communication. The remaining time slots TS1 to TS15 and TS17 to TS31 are assigned to channels and used for communicating data. It should be noted that in a case where a V5 signaling message is used, the V5 signaling message is transmitted using the time slot TS15, TS16 or TS31.

Figure 4A:
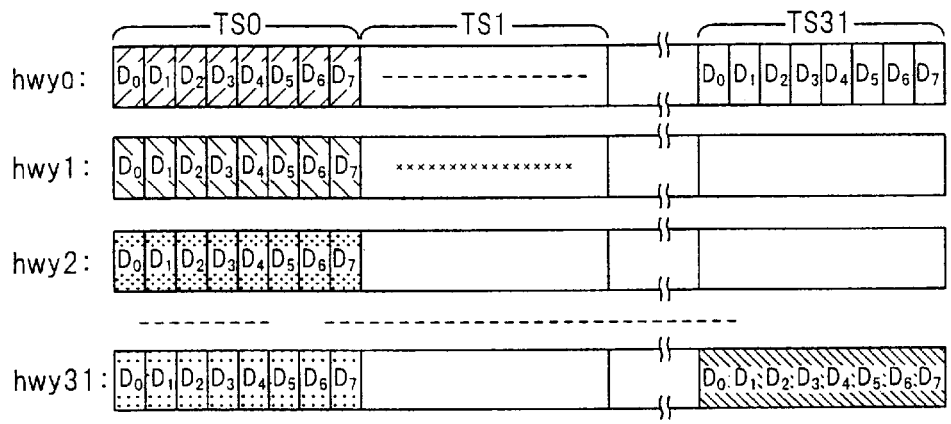
FIGS. 4A, 4B and 4C are diagrams useful in describing rearrangement of time slots.

If the 1024 times slots of one frame are separated according to highway and rewritten, the result is as shown in FIG. 4A. Whenever one frame of data enters via the optical fiber 13a, the trunk unit 1a rearranges the frame from the form shown in FIG. 4A to that shown in FIG. 4B and sends the data to the trunk bus 11 in this order in sync with a 8.192 MHz clock. The frame is rearranged in the following order, where 8 bit PCM data in a jth time slot TSj of an ith highway hwyi is expressed by hwyi TSj:

(hwy0 TS0) → (hwy1 TS0) → ... (hwy31 TS0) →
(hwy0 TS1) → (hwy1 TS1) → ... (hwy31 TS1) →
...
(hwy0 TS31) → (hwy1 TS31) → ... (hwy31 TS31)

Figure 4B:
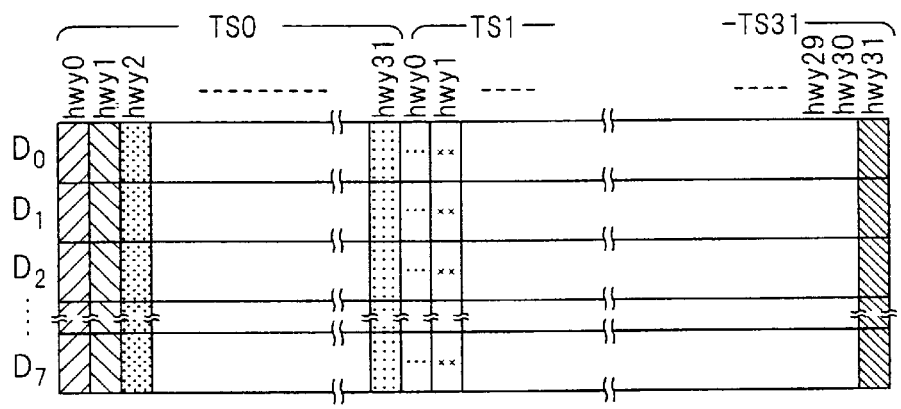

In order to clarify the correspondence between FIGS. 4A and 4B, the corresponding portions are indicated by like patterns.

Figure 4C:
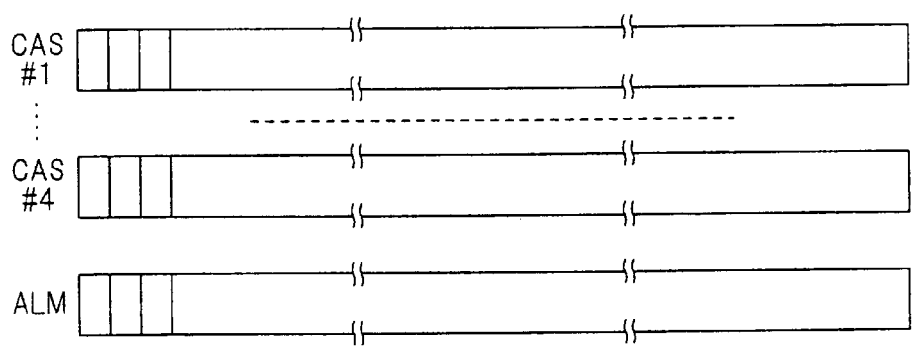

If the trunk unit 1a is configured for CAS mode operation, then, when the above-mentioned 8 bit PCM data is sent to the trunk bus 11, 4 bit CAS signaling data (CAS#1 to CAS#4) and 1 bit alarm data ALM shown in FIG. 4C is appended to the data so that a total of 13 bit data is sent to the trunk bus 11. The CAS messages CAS#1 to CAS#4 of four bits are created based upon CAS signaling bits contained in the $16^{th}$ time slots of the highways hwy0 to hwy31, and the 1 bit alarm data is created based upon an alarm bit contained in the 0 thtime slot (the sync time slot) of each highway.

(C) Bus structure (a) Trunk bus

Figure 5:
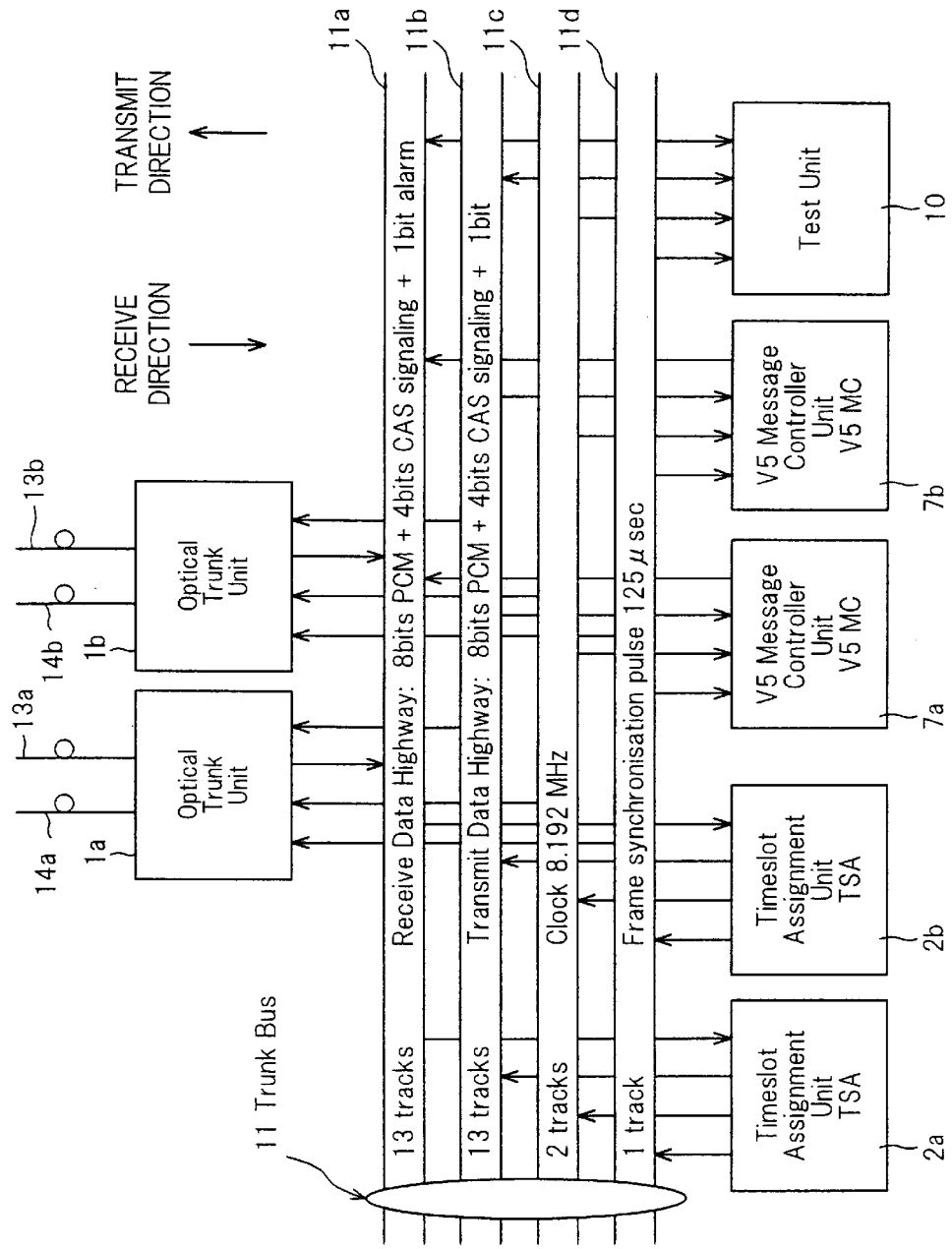
FIG. 5 is a diagram useful in describing the structure of a trunk bus.

FIG. 5 is a diagram useful in describing the structure of the trunk bus 11. The trunk bus 11 has 13 signal tracks (receive trunk buses) 11a which transmit 13 bits of data in the receive direction, 13 signal tracks (transmit trunk buses) 11b which transmit 13 bits of data in the transmit direction, two signal tracks 11c which transmit two 8.192 MHz clock signals output from the time-slot assignment unit 2a, and one frame synchronization track 11d which transmits a frame synchronization pulse generated every 125 μs by the time-slot assignment unit 2a.

The trunk bus 11 provides the following functions:

(1) In the receive direction of transmission, the signal tracks 11a transmit the 13 bit data output from the trunk unit 1a, namely "communication data / CAS message / trunk-unit alarm data", to the time-slot assignment unit 2a.

(2) In the transmit direction of transmission, the signal tracks 11b transmit the 13 bit data output from the time-slot assignment unit 2a, namely "communication data / CAS message / TSA alarm data", to trunk unit 1a.

(3) The frame synchronization track 11d transmits a 125 μs frame synchronization pulse in order to identify the starting time slot of the frame.

(4) The clock signal tracks 11c transmit a clock signal for clocking "data / channel-associated signaling alarm state".

(5) The clock frequency is 8.192 MHz.

(6) Each unit sends data to the BWB (bus) at the timing of the rising edge of a first clock signal.

(7) Each unit samples (accepts) signals from the BWB (bus) at the timing of the rising edge of a second clock signal.

(8) The transfer rate of the multiplexed data is 65.536 Mbps in both the transmit and receive directions.

(9) The "communication data / CAS message / alarm data" are multiplexed into 1024 time slots.

(10) The 1024 time slots are grouped into 32 sets of highways.

(11) Each highway contains 32 time slots assembled in the format defined by ITU-T G.704 to obtain the bit rate of 2.048 Mbps.

(12) The highways are time-interleaved beginning at the timing pulse marker.

(13) The alarm-signal track is made logical "1" whenever the source of transmission of multiplexed data or a CAS message is abnormal.

(14) The channel-associated signaling tracks (CAS tracks) transmit the 4 bit signaling messages of respective channels extracted from the $16^{th}$ time slots in the 2.048 Mbps stream.

(15) The time-slot assignment unit 2a provides the clock signal and frame synchronization signal to all trunk units.

(b) Tributary bus

Figure 6:
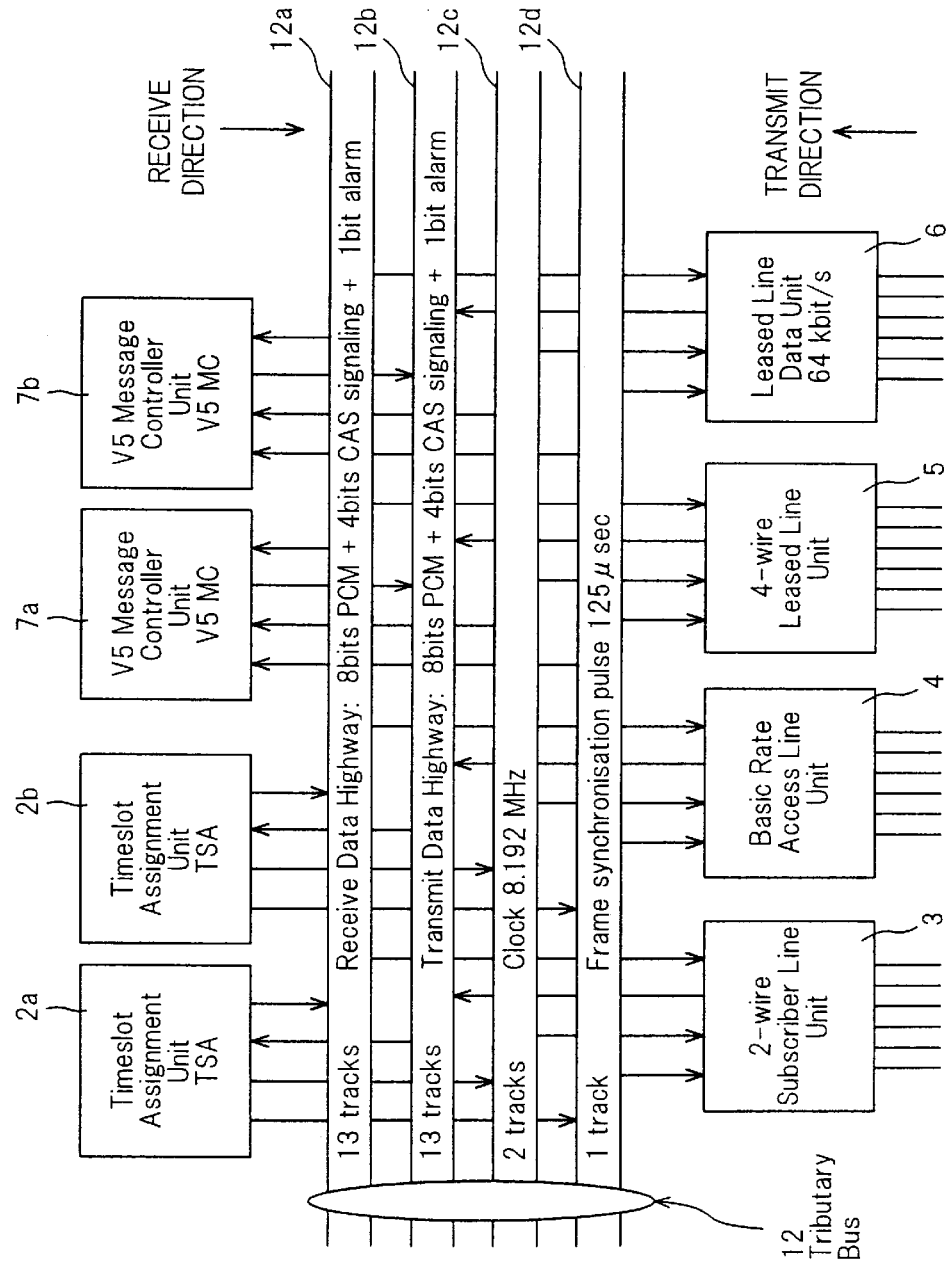
FIG. 6 is a diagram useful in describing the structure of a tributary bus.

FIG. 6 is a diagram useful in describing the structure of the tributary bus. The tributary bus 12 has 13 signal tracks (receive tributary buses) 12a which transmit 13 bits of data in the receive direction, 13 signal tracks (transmit tributary buses) 12b which transmit 13 bits of data in the transmit direction, two signal tracks 12c which transmit two 8.192 MHz clock signals output from the time-slot assignment unit 2a, and one frame synchronization track 12d which transmits a frame synchronization pulse generated every 125 μs by the time-slot assignment unit 2a.

The tributary bus provides the following functions:

(1) The signal tracks 12a transmit the 13 bit data output from the time-slot assignment unit 2a, namely "communication data/CAS message/TSA alarm data", to the tributary units 3 to 6.

(2) The signal tracks 12b transmit the 13 bit data output from the tributary units 3 to 6, namely "communication data/CAS message/tributary-unit alarm data", to the time-slot assignment unit 2a.

(3) The frame synchronization track 12d transmits a 125 μs frame synchronization pulse in order to identify the starting time slot of the frame.

(4) The clock signal tracks 12c transmit a clock signal for clocking "communication data/CAS message/alarm data on the BWB".

(5) The clock frequency is 8.192 MHz.

(6) Each unit sends data to the BWB (bus) at the timing of the rising edge of a first clock signal.

(7) Each unit samples (accepts) signals from the BWB (bus) at the timing of the rising edge of a second clock signal.

(8) The transfer rate of the multiplexed data is 65.536 Mbps in both the transmit and receive directions.

(9) The "communication data/CAS message/alarm data" are multiplexed into 1024 time slots.

(10) The 1024 time slots are grouped into 32 sets of highways.

(11) Each highway contains 32 time slots assembled in the format defined by ITU-T G.704 to obtain the bit rate of 2.048 Mbps.

(12) The highways are time-interleaved beginning at the timing pulse marker.

(13) The alarm-signal track is made logical "1" whenever the source of transmission of multiplexed data or a CAS message is abnormal.

(14) The channel-associated signaling tracks (CAS tracks) transmit the 4 bit signaling messages of respective channels extracted from the $16^{th}$ time slots in the 2.048 Mbps stream.

(c) Control bus

The control bus 15 (see FIG. 2) provides the following functions:

(1) The control bus 15 is a signal track for full-duplex communication.

(2) The control bus 15 supports a multiple-access protocol that is capable of addressing each unit based upon position on the BWB.

(3) Each unit detects its own position on the BWB by a fixed binary code associated with the position on the BWB.

(4) The control bus 15 is used to exchange data between units.

(5) The control bus 15 is used to exchange V5.2 PSTN (Public Switched Telephone Network) line signaling messages between tributary units that support V5.2 signaling and the V5 message controller 7a.

(6) The control bus 15 is used for all alarm reporting.

By virtue of features (2) and (3) mentioned above, each unit can be inserted into a slot at any position on the BWB. However, units such as the main processor are adapted to acquire the positions and identifying IDs of the other units. As a result, the main processor unit 8 is capable of ascertaining the position (address) of each unit and the V5 message controller 7a also is capable of ascertaining the addresses of the tributary units 3 to 6, trunk unit 1a and time-slot assignment unit 2a, etc.

(D) Unit structure (a) Trunk unit

Figure 7:
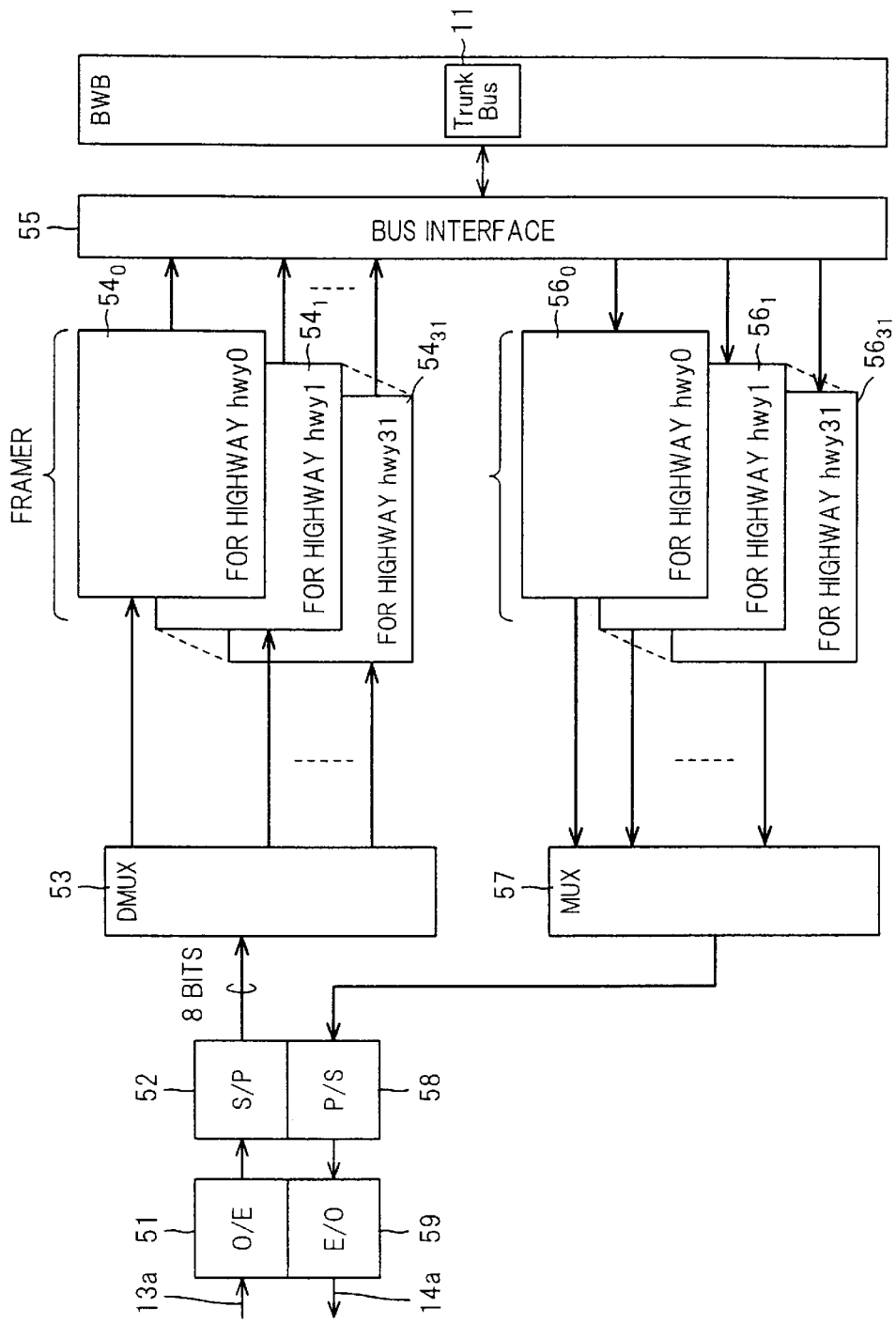
FIG. 7 is a block diagram of a trunk unit.

FIG. 7 is a block diagram of trunk unit. An optoelectronic transducer (O/E transducer) 51 converts the time-division multiplexed signal, which enters from the optical fiber 13a, to an electrical signal, a serial/parallel transducer (S/P transducer) 52 for converting data, which enters as a bit serial, to 8 bit parallel data conforming to the time slots, and a demultiplexer 53 for demultiplexing the parallel data according to the highways hwy0 to hwy31 and inputting the data framers $54_0$ to $54_{31}$ corresponding to respective ones of the highways. The data framers $54_0$ to $54_{31}$ store the input 32 times slots of data of the respective highways in order in an internal elastic store in the manner shown in FIG. 4A and then send the PCM data to the trunk bus 11 via a bus interface 55 in the order illustrated in FIG. 4B. In this case, if the trunk unit 1a has been configured so as to operate in accordance with the CAS mode, the 4 bit CAS signaling data (CAS#1 to CAS#4) and 1 bit alarm data ALM shown in FIG. 4C is appended to the 8 bit PCM data so that a total of 13 bit data is sent to the trunk bus 11.

Reframers $56_0$ to $56_{31}$ corresponding to respective ones of the highways hwy0 to hwy31 accept only data corresponding to their own highways from among data input to the bus interface 55 in the order shown in FIG. 4B and store the data in an internal memory in the manner illustrated in FIG. 4A. In this case, if the system has been configured so as to operate in the CAS mode, the reframer inserts the CAS data into the time slot TS16 and inserts the synchronization signal into time slot 0 to perform reframing.

A multiplexer 57 multiplexes the data in time slots TS0 to TS31 from the reframers $56_0$ to $56_{31}$ in the order of the highways and inputs the multiplexed data to a parallel/serial converter (P/S converter) 58. The latter subjects the data to a parallel-to-serial conversion. An electro-optic transducer (E/O transducer) 59 converts the serial converted bit data to an optical signal and sends the optical signal to an optical fiber 14a.

The trunk unit 1a is connected to the trunk bus 11 in accordance with the following rules:

(1) The trunk unit 1a is allocated an integral number of contiguous highways in trunk bus 11.

(2) The number of highways allocated to the trunk unit is arbitrary but 32 must be the limit.

(3) As long as the total number of highways used is 32 or less, a plurality of trunk units can be installed.

(4) The trunk unit is capable of sending and receiving data only on allocated highways.

(5) The trunk unit terminates the CAS path if so requested.

(6) The CAS message on each channel in each group is recovered at single multiframe intervals, i.e., at intervals of 2 ms, and is placed on the trunk bus every 125 μs.

(7) Where the V5.2 signaling messages are used, the CAS messages are ignored.

(8) The trunk unit can be placed at any position on the BWB.

(b) Tributary unit

Figure 8:
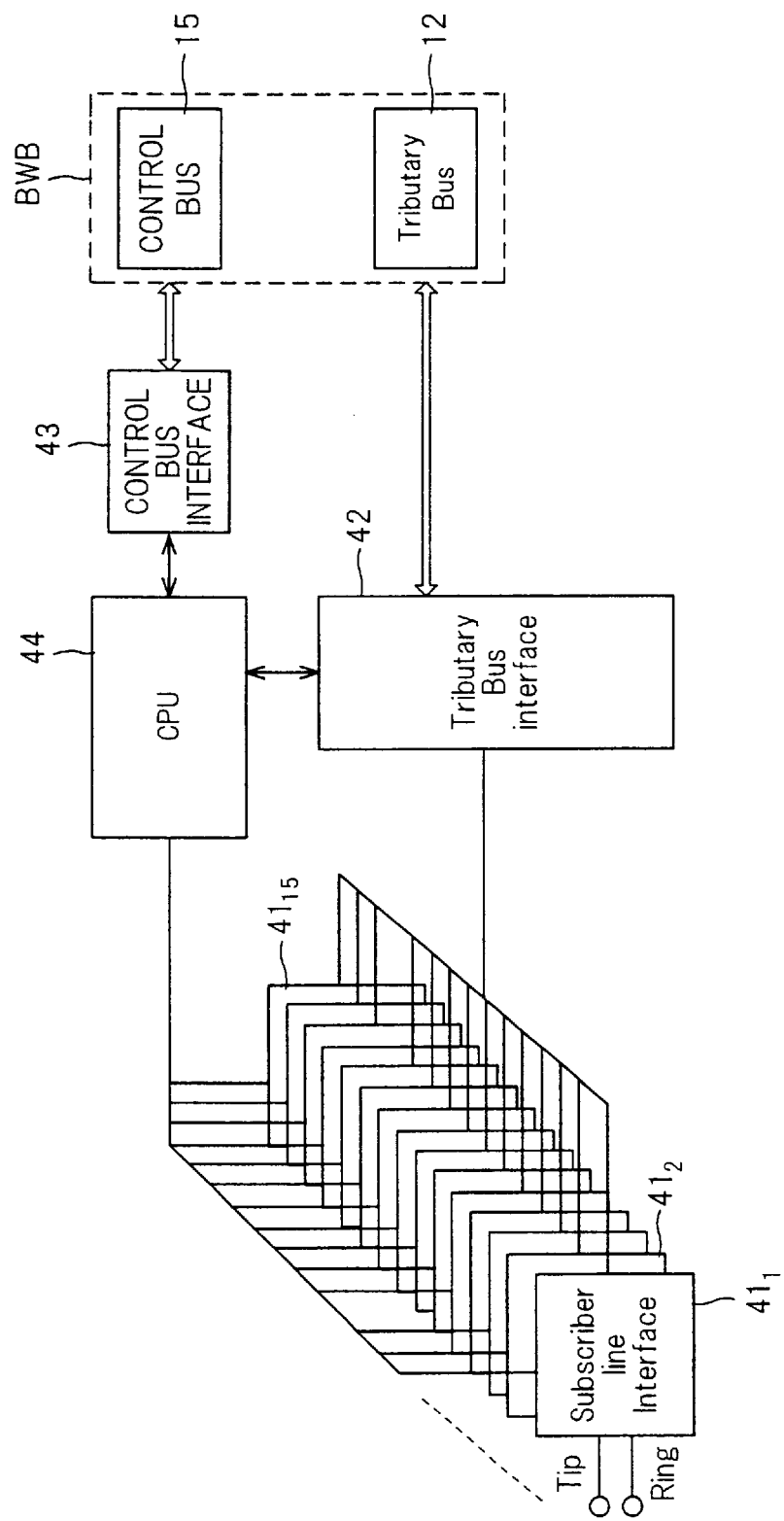
FIG. 8 is a block diagram showing an example of a tributary unit.

FIG. 8 shows an example of the structure of a tributary unit. In this example, the unit accommodates 15 64 Kbps subscriber terminals. The tributary unit has subscriber line interfaces $41_1$, to $41_{15}$ at 15 ports connected to subscriber terminals, a tributary bus interface 42 provided between the tributary bus 12 and coder/decoder portions (not shown) of the subscriber line interfaces $41_1$, to $41_{15}$, a control bus interface 43, and a processor 44 for converting the status (on-hook, off-hook, etc.) of a 2-wire metallic line to a CAS or V5-based signaling message.

The tributary units are connected to the tributary bus 12 in accordance with the following rules:

(1) Tributary units are allocated a plurality of contiguous time slots in a single highway or in a plurality of highways.

(2) The number of interfaces of a tributary unit and the number of time slots per interface decide the number time slots which the tributary unit requires.

(3) For tributary units which require less than 32 time slots, the total number of time slots must exist in one highway.

(4) For a unit which requires time slots that are a whole-number multiple of 32 time slots, contiguous highways are allocated.

(5) A tributary unit is capable of sending and receiving data to and from the tributary bus in the time slots that have been allocated to it.

(6) When many tributary units have been installed, two or more tributary units share a highway on the condition that these units do not share a time slot.

(7) A number of tributary units can be installed as long as the total number of highways used is equal to or less than 32.

(8) The tributary unit terminates the CAS path in the receive direction.

(9) The CAS message is processed at intervals of 2 ms even though it passes through the tributary bus every 125 μs.

(10) Though the channel-associated CAS message is updated at the rate of 2 ms, the tributary unit transmits the signaling message every 125 μs.

(11) Where the V5.2 signaling messages are used, the CAS messages are ignored.

(12) The trunk unit can be placed at any position on the BWB.

(c) Time-slot assignment unit (TSA)

Figure 9:
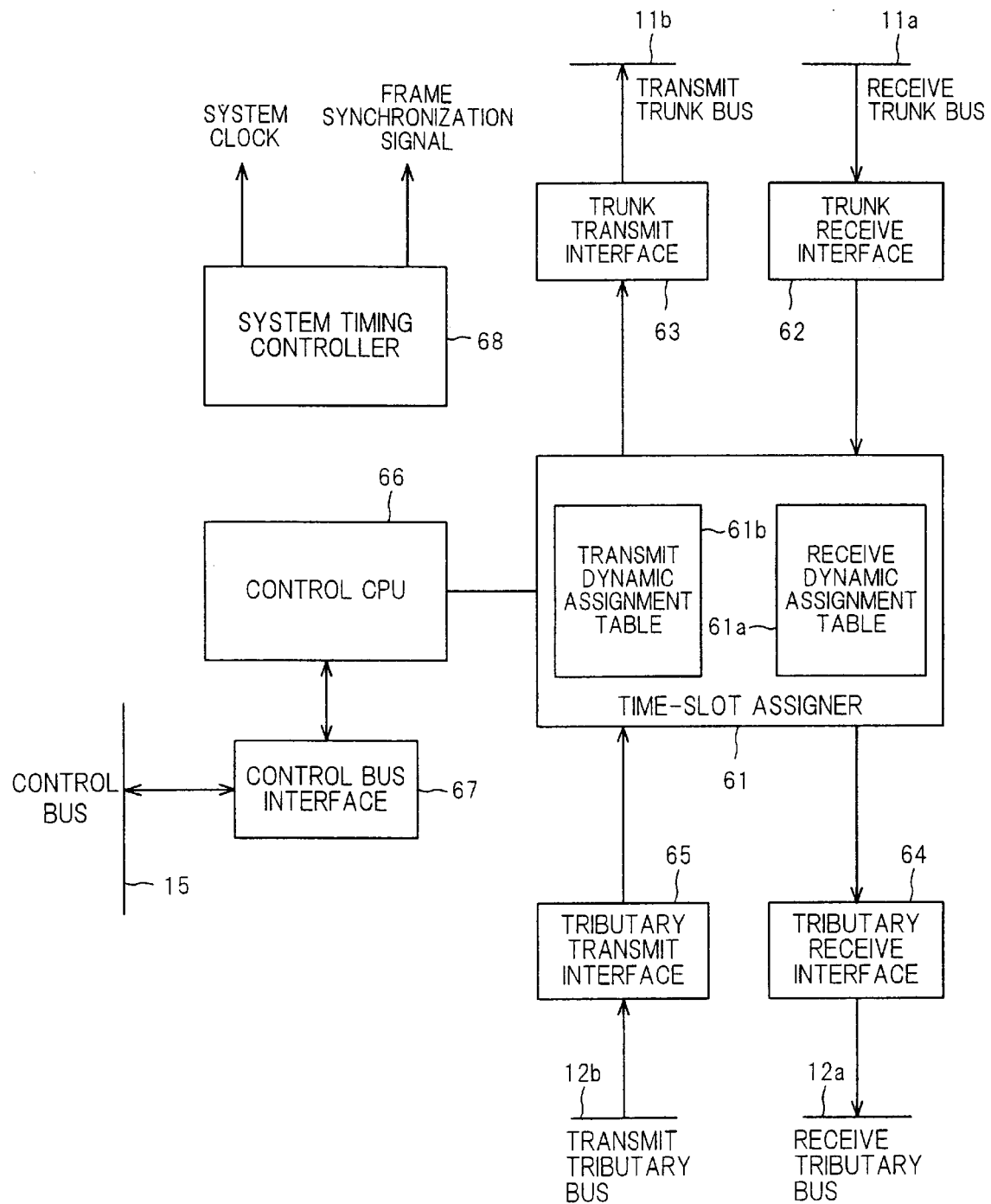
FIG. 9 is a block diagram showing the structure of a time-slot assignment unit (TSA)

FIG. 9 is a diagram showing the structure of the time-slot assignment unit.

A time-slot assigner 61 is connected to the receive trunk bus 11a and transmit trunk bus 11b via a trunk receive interface 62 and trunk transmit interface 63, respectively, and is connected to the receive tributary bus 12a and transmit tributary bus 12b via a tributary receive interface 64 and a tributary transmit interface 65, respectively. Further, the time-slot assigner 61 has a receive dynamic assignment table 61a for interchanging time slots dynamically in the receive direction, and a transmit dynamic assignment table 61b for interchanging time slots dynamically in the transmit direction. The time-slot assigner 61 has a function for transmitting a "C-channel" via the receive tributary bus 12a in response to a request from the V5 message controller 7a. The "C-channel" is a V5 signaling message, where C is the abbreviation for "communication".

A CPU 66 for control is connected to the control bus 15 via a control bus interface 67 and receives a time-slot dynamic assignment request, an assignment delete request and a C-channel transmit request from the v5 message controller 7a via this control bus. If a time-slot dynamic assignment request is received, the control CPU 66 adds this request to the transmit or receive dynamic assignment table 61a or 61b. If an assignment delete request is received, the control CPU 66 deletes this dynamic assignment from the transmit or receive dynamic assignment table 61a or 61b. If the "C-channel" transmit request is received, the control CPU 66 causes the time-slot assigner 61 to send the "C-channel" to the receive tributary interface 12a.

A system-timing controller 68 generates the system clock and frame synchronization signal and sends these signals to the trunk bus and tributary bus.

To sum up, therefore, the time-slot assignment unit (TSA) 2a has the following functions:

(1) The TSA is connected to both the trunk bus 11 and tributary bus 12.

(2) The TSA provides system timing for all units.

(3) The TSA provides the trunk bus 11 with the clock and frame synchronization signal.

(4) The TSA provides the tributary bus 12 with the clock and frame synchronization signal.

(5) The TSA supports 1024 trunk time slots consisting of 8 bit data, 4 bit CAS messages and a 1 bit alarm.

(6) The TSA supports 1024 tributary time slots consisting of 8 bit data, 4 bit CAS messages and a 1 bit alarm.

(7) The TSA interchanges any time slots between the trunk bus 11 and tributary bus 12.

(8) The TSA can be placed at any position on the BWB.

(d) V5 message controller (V5MC)

Figure 10:
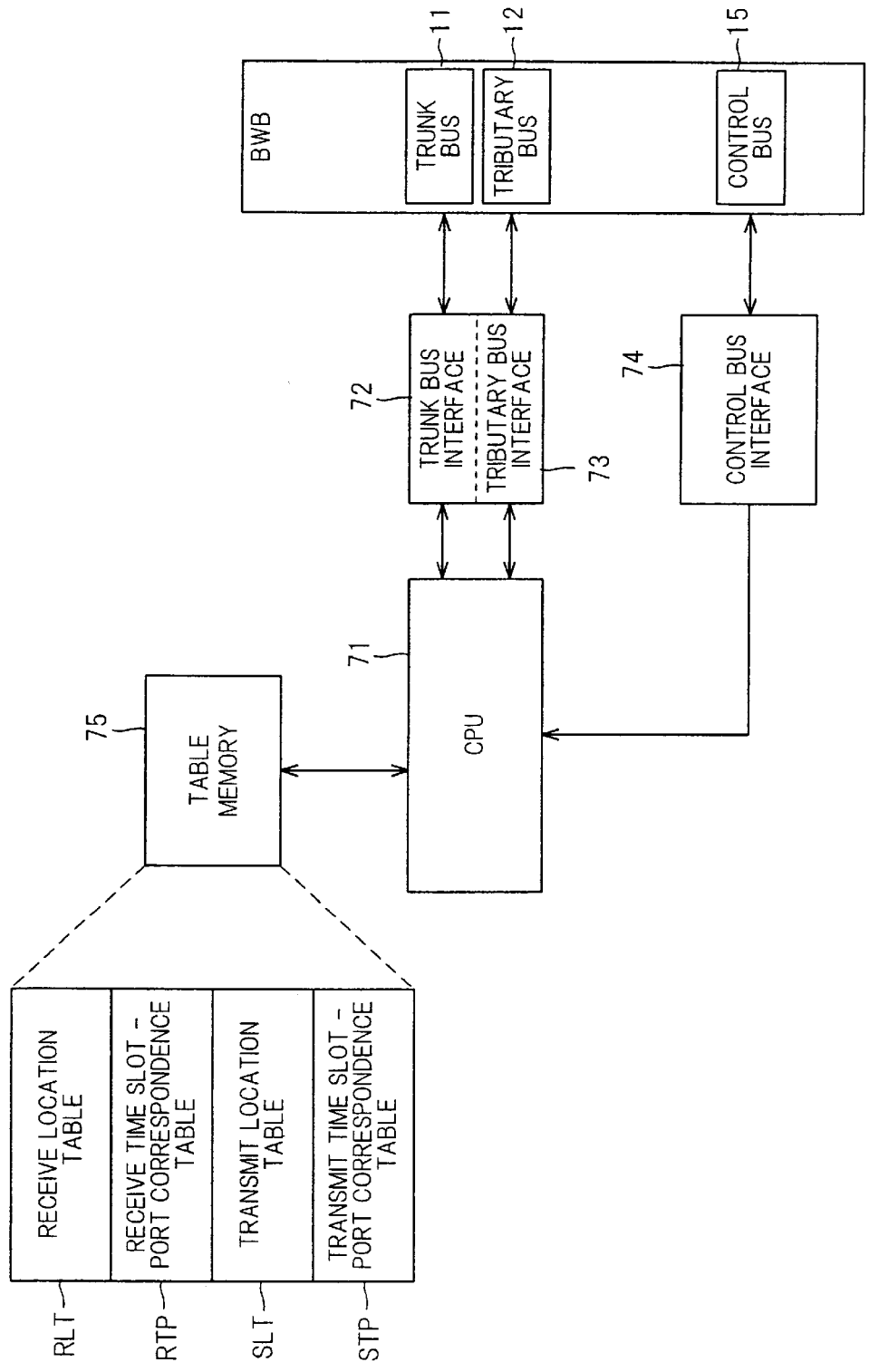
FIG. 10 is a block diagram of a V5 message controller (V5MC)

FIG. 10 is a diagram showing the structure of the V5 message controller 7a. The V5 message controller 7a performs time-slot assignment control dynamically based upon a V5 signaling message contained in a "C-channel" from a local switch or PSTN protocol message from a tributary unit which supports the V5.2 protocol. Dynamic assignment of time slots involves (1) not assigning time slots to subscribers in a static manner, (2) assigning vacant time slots to subscribers as appropriate, (3) halting assignment of time slots if a vacant time slot is not available (due to congestion), (4) canceling time-slot assignment if communication is completed, and (5) assigning a vacant time slot to another subscriber if a vacant time slot is generated.

A CPU 71, which forms the nucleus of the V5 message controller, is connected to the trunk bus 11 via a trunk bus interface 72, to the tributary bus 12 via a tributary interface 73 and to the control bus 15 via a control bus interface 74. A table memory 75 stores various tables necessary for dynamic assignment control in the receive and transmit directions. A location table RLT and a correspondence table RTP indicating the correspondence between time slots and assigned ports are stored as the tables for the receive direction, and a location table SLT and a correspondence table STP indicating the correspondence between time slots and assigned ports are stored as the tables for the transmit direction.

As shown in FIG. 11A, the receive location table RLT stores, in correspondence with the numbers of receive ports, (1) card numbers of tributary units to which ports belong and (2) time slots (highway numbers and time-slot numbers) of the receive tributary bus 12a assigned to the ports. As shown in FIG. 11B, the receive correspondence table RTP stores the correspondence between the time slots (TS0–TS31) of each of the highways (hwy0–hwy31) of receive tributary bus 12a and the numbers of receive ports to which these time slots have been assigned. Vacant time slots of the receive tributary bus 12a can be ascertained by referring to the correspondence table RTP.

As shown in FIG. 11C, the transmit location table SLT stores, in correspondence with the numbers of transmit ports, (1) card numbers of tributary units to which ports belong and (2) time slots (highway numbers and time-slot numbers) of the transmit tributary bus 12b assigned to the ports. As shown in FIG. 11D, the transmit correspondence table STP stores the correspondence between the time slots (TS0–TS31) of each of the highways (hwy0–hwy31) of transmit tributary bus 12b and the numbers of transport ports to which these time slots have been assigned. Vacant time slots of the transmit tributary bus can be ascertained and whether or not a congested state exists can be recognized by referring to the correspondence table STP.

(e) Dynamic assignment control of time slots (at reception)

Figure 12:
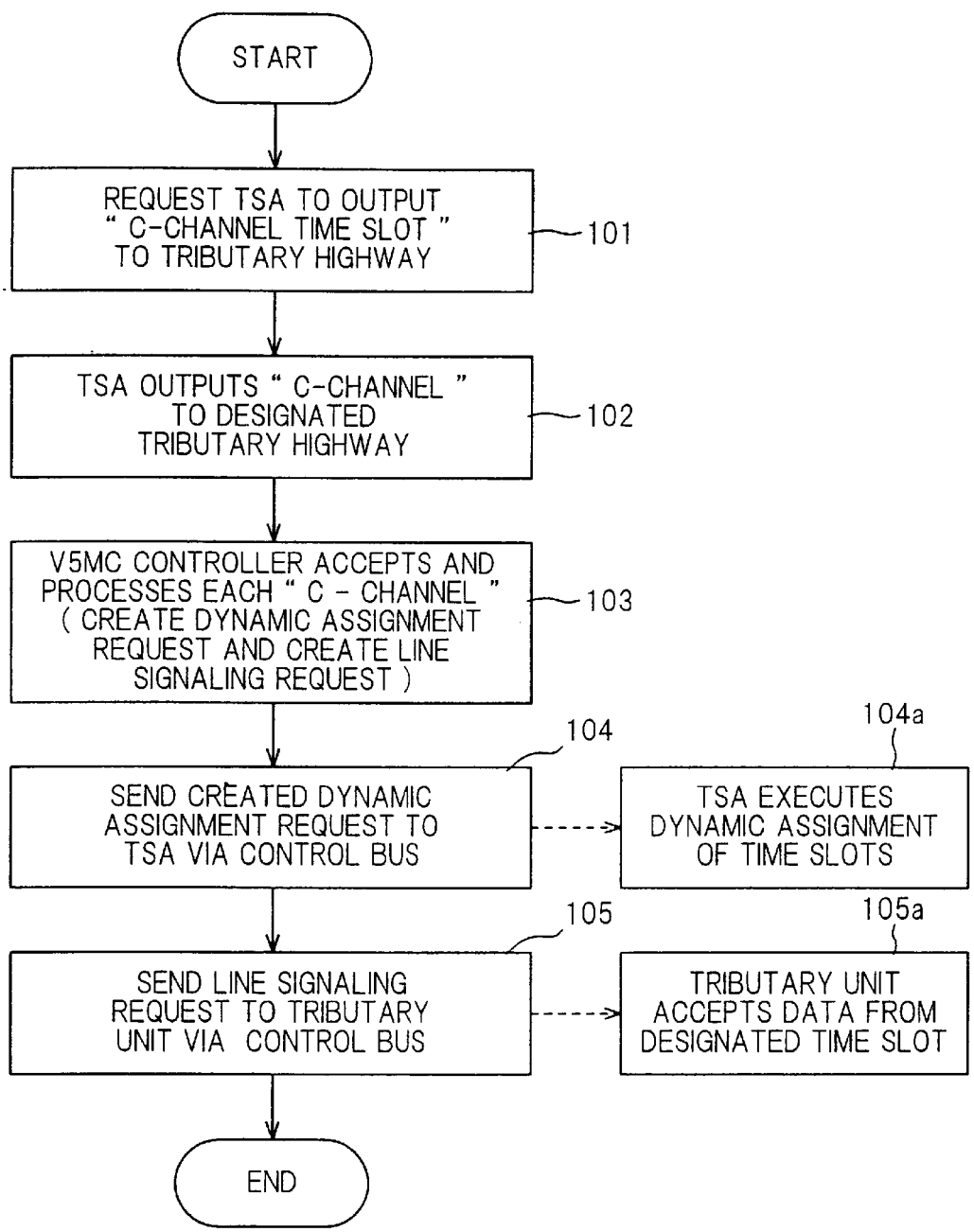
FIG. 12 is a flowchart illustrating processing for dynamic assignment control executed by the V5 message controller at the time of reception.

FIG. 12 is a flowchart illustrating processing for dynamic assignment control of time slots executed by the V5 message controller 7a at the time of reception.

The V5 message controller 7a requests the time-slot assignment unit 2a to output the V5 signaling message ("C-channel") from the local switch to the tributary bus 12a via the control bus 15 (step 101).

Figure 13:
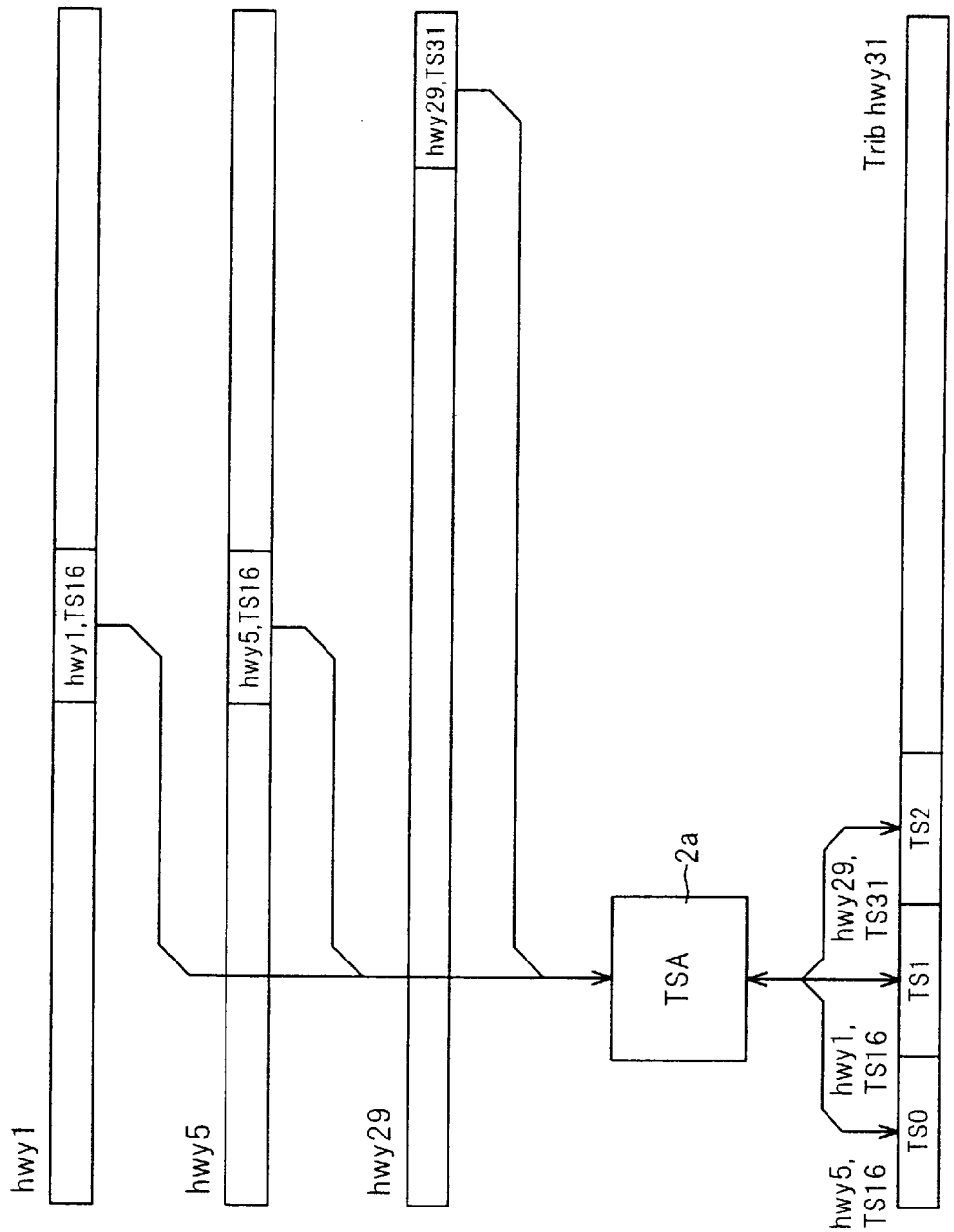
FIG. 13 is a diagram useful in describing transmission/reception of a "C-channel" between the time-slot assignment unit and the V5 message controller.

A "C-channel time slot" appears in a predetermined time slot (TS16, TS15 or TS31) of a predetermined highway. Which time slot of which highway is the "C-channel time slot" is set in the time-slot assignment unit 2a in advance. Accordingly, when the time-slot assignment unit 2a receives the request from the V5 message controller 7a, the time-slot assignment unit 2a extracts the "C-channels" and sends them successively from the starting time slot of the designated highway on the tributary bus 12a (step 102). FIG. 13 illustrates a case where the time slot TS16 of highway hwy1, time slot TS16 of highway hwy5 and time slot TS31 of highway hwy29 are "C-channel time slots", and the "C-channels" are transmitted successively from the starting time slot of highway hwy31 on the tributary bus 12a.

Since the number of "C-channels" and the number of the highway on the tributary bus on which the "C-channels" are sent has been set in advance, the V5 message controller 7a accepts each "C-channel" from the designated tributary highway and, on the basis of these "C-channels", creates a time-slot dynamic assignment request and a line signaling request (step 103). The dynamic assignment request is for requesting the time-slot assignment unit 2a to assign a vacant time slot TB to a call-destination port and interchange the data of time slot $T_A$ of the incoming call on the trunk side with the data of the time slot $T_B$ on the tributary side (i.e., to interchange the time slots). The line signaling request is for notifying the tributary unit of the time slot $T_B$ on the tributary side.

Next, the V5 message controller 7a sends the dynamic assignment request that has been created to the time-slot assignment unit 2a via the control bus 15 (step 104). In response, the time-slot assignment unit 2a adds the dynamic assignment request to the receive dynamic assignment table 61a (FIG. 9) and cross-connects the time slot $T_A$ to the time slot $T_B$ (step 104a).

The V5 message controller 7a sends the line signaling request that has been created to the tributary unit, to which the call-destination port belongs, via the control bus 15 (step 105). In response, the tributary unit accepts the data from the designated time slot $T_B$ on the receive tributary bus 12a (step 105a).

Figure 14:
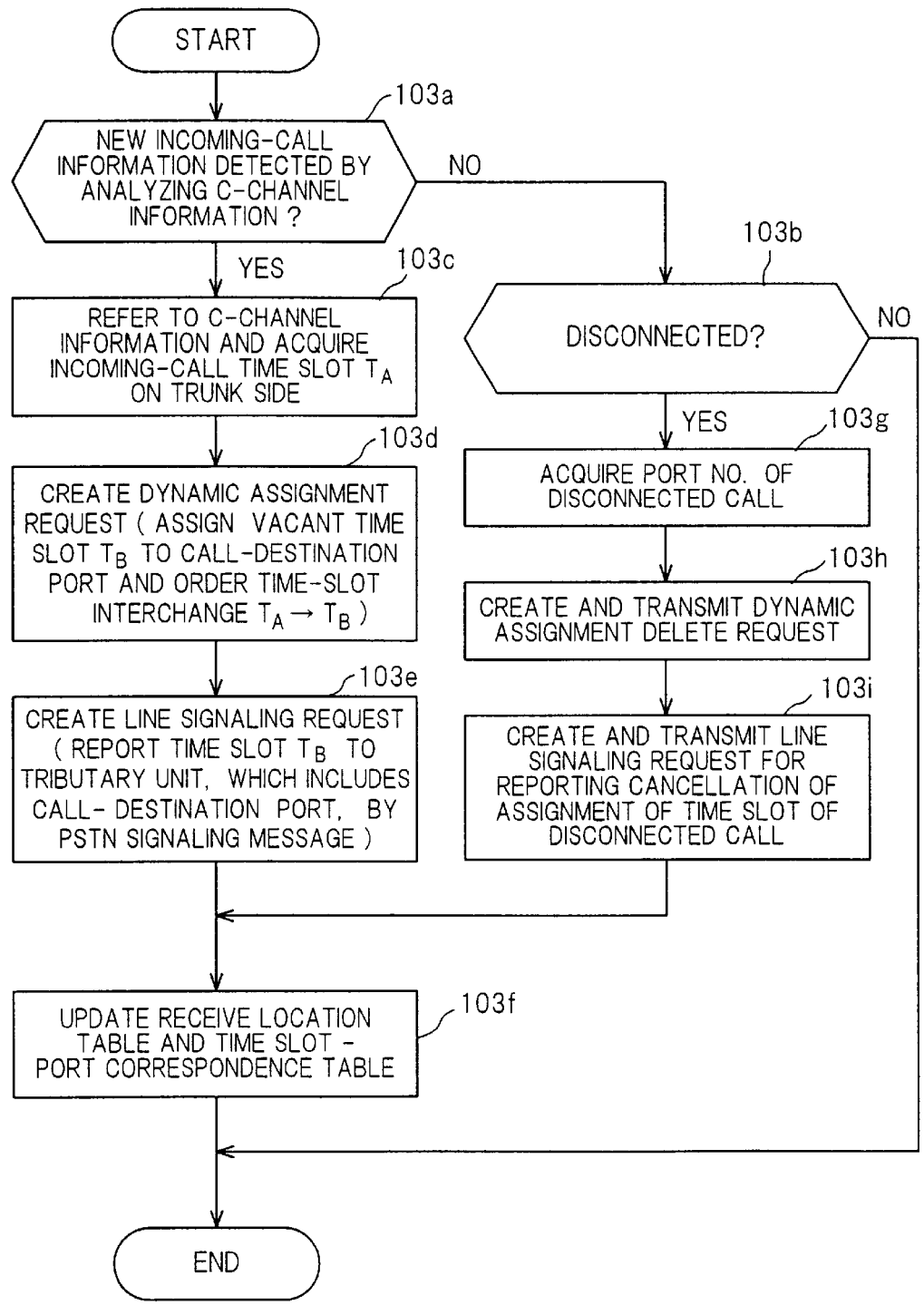
FIG. 14 is a flowchart of processing executed by the V5 message controller after reception of a C-channel.

FIG. 14 is a detailed flowchart of processing (step 103 in FIG. 13) executed by the V5 message controller 7a after reception of a C-channel.

Upon receiving the C-channel, the V5 message controller 7a analyzes the C-channel and determines whether it contains new incoming-call information (step 103a). If the answer is "NO", the V5 message controller 7a determines whether the C-channel contains call-disconnect information (step 103b). If the answer is "NO", this processing is exited.

If it is determined at step 103a that the C-channel contains new incoming-call information, then the V5 message controller 7a refers to the C-channel and acquires the incoming-call time slot $T_A$ on the trunk side (step 103c). Next, the V5 message controller 7a creates the dynamic assignment request for referring to the correspondence table RTP to obtain the vacant time slot TB, assigning this time slot to the call-destination port and interchanging the data in the time slot $T_A$ with that in the time slot $T_B$ (step 103d). The V5 message controller 7a then creates the line signaling request (PSTN signaling message) for referring to the receive location table RLT to obtain the tributary unit that includes the call-destination port and reporting the time slot $T_B$ to this tributary unit (step 103e). The V5 message controller 7a subsequently updates the receive location table RLT and the correspondence table RTP (step 103f) and then terminates processing.

If it is determined at step 103b that the C-channel contains disconnect information, the V5 message controller 7a acquires the disconnect-call time slot on the trunk side and the port number (step 103g). The V5 message controller 7a then sends a request to delete the dynamic assignment of the disconnect call to the time-slot assignment unit 2a via the control bus 15 (step 103h), creates a line signaling request, which gives notification of cancellation of time-slot assignment, and transmits the request to the prescribed tributary unit (step 103i). The V5 message controller 7a subsequently updates the receive location table RLT and the correspondence table RTP (step 103f) and then terminates processing.

(f) Dynamic assignment control of time slots (at transmission)

Figure 15:
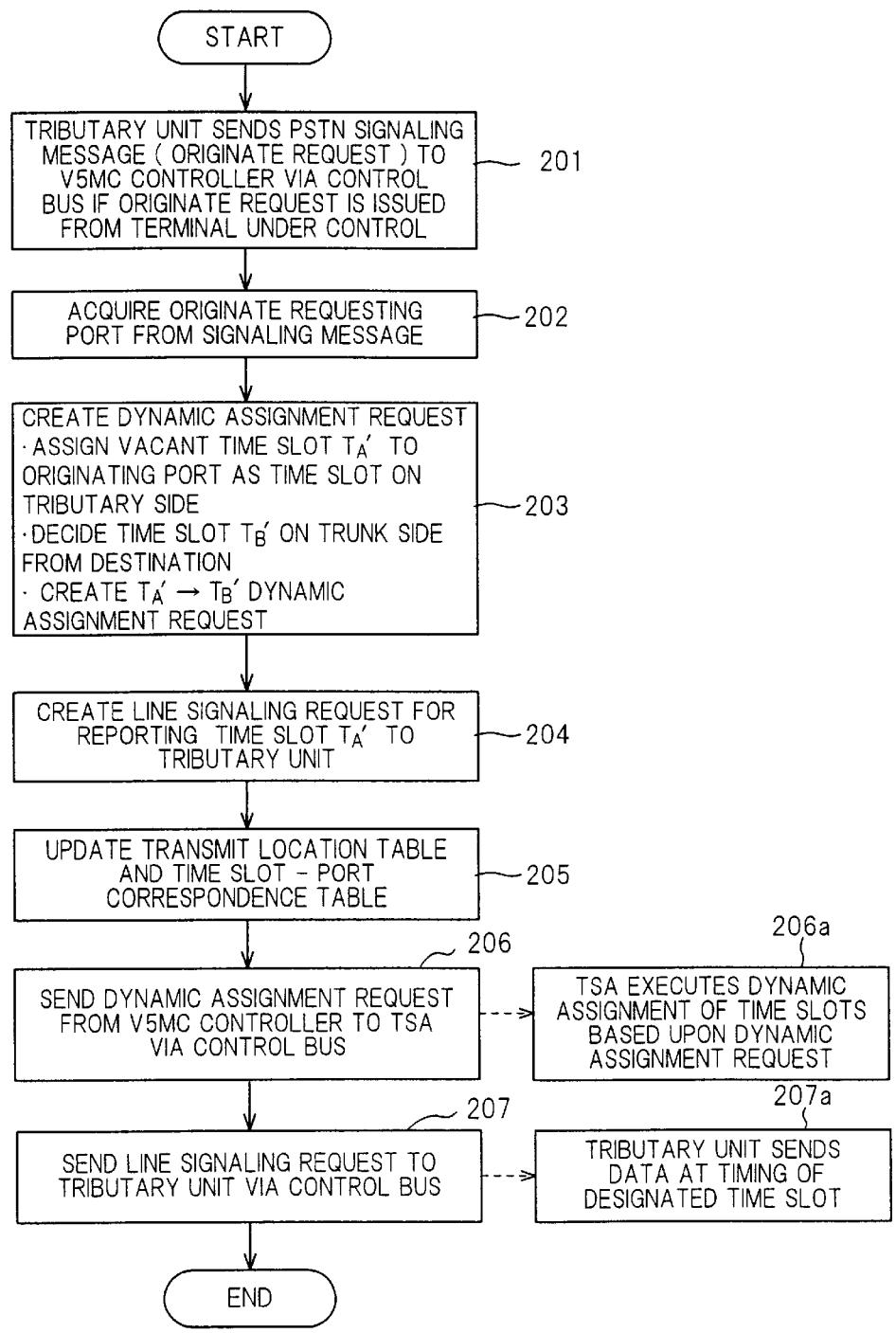
FIG. 15 is a flowchart illustrating processing for dynamic assignment control executed by the V5 message controller at the time of transmission.

FIG. 15 is a flowchart illustrating processing for dynamic assignment control of time slots executed by the V5 message controller 7a at the time of transmission.

If a tributary unit is issued an originate request from a terminal under control, the tributary unit sends an PSTN signaling message (an originate request) to the V5 message controller 7a via the control bus 15 (step 201). The V5 message controller 7a then acquires from the PSTN signaling message the port that issued the originate request (step 202).

Next, the V5 message controller 7a creates a dynamic assignment request (step 203). Specifically, the V5 message controller 7a obtains a vacant time slot $T_A'$ by referring to the correspondence table STP and assigns this time slot to the originating port as a time slot on the tributary side. Further, the V5 message controller 7a decides a time slot $T_B'$ on the trunk side and creates a dynamic assignment request for interchanging the time slot $T_A'$ with the time slot $T_B'$.

The V5 message controller 7a then creates a line signaling request (PSTN signaling message) for reporting the time slot $T_A'$ to the tributary unit that includes the originating port (step 204) and updates the transmit location table SLT and correspondence table STP (step 205).

Next, the V5 message controller 7a sends the created dynamic assignment request to the time-slot assignment unit 2a via the control bus 15 (step 206). In response, the time-slot assignment unit 2a adds the dynamic assignment request to the transmit dynamic assignment table 61b (see FIG. 9) and cross-connects the data of time slot $T_A'$ to time slot $T_B'$ (step 206a)

The V5 message controller 7a sends the line signaling request that has been created to the tributary unit, to which the originating port belongs, via the control bus 15 (step 207). In response, the tributary unit transmits the data to the transmit tributary bus at the timing of the designated time slot $T_A'$ (207a).

(g) Congestion processing

Figure 16:
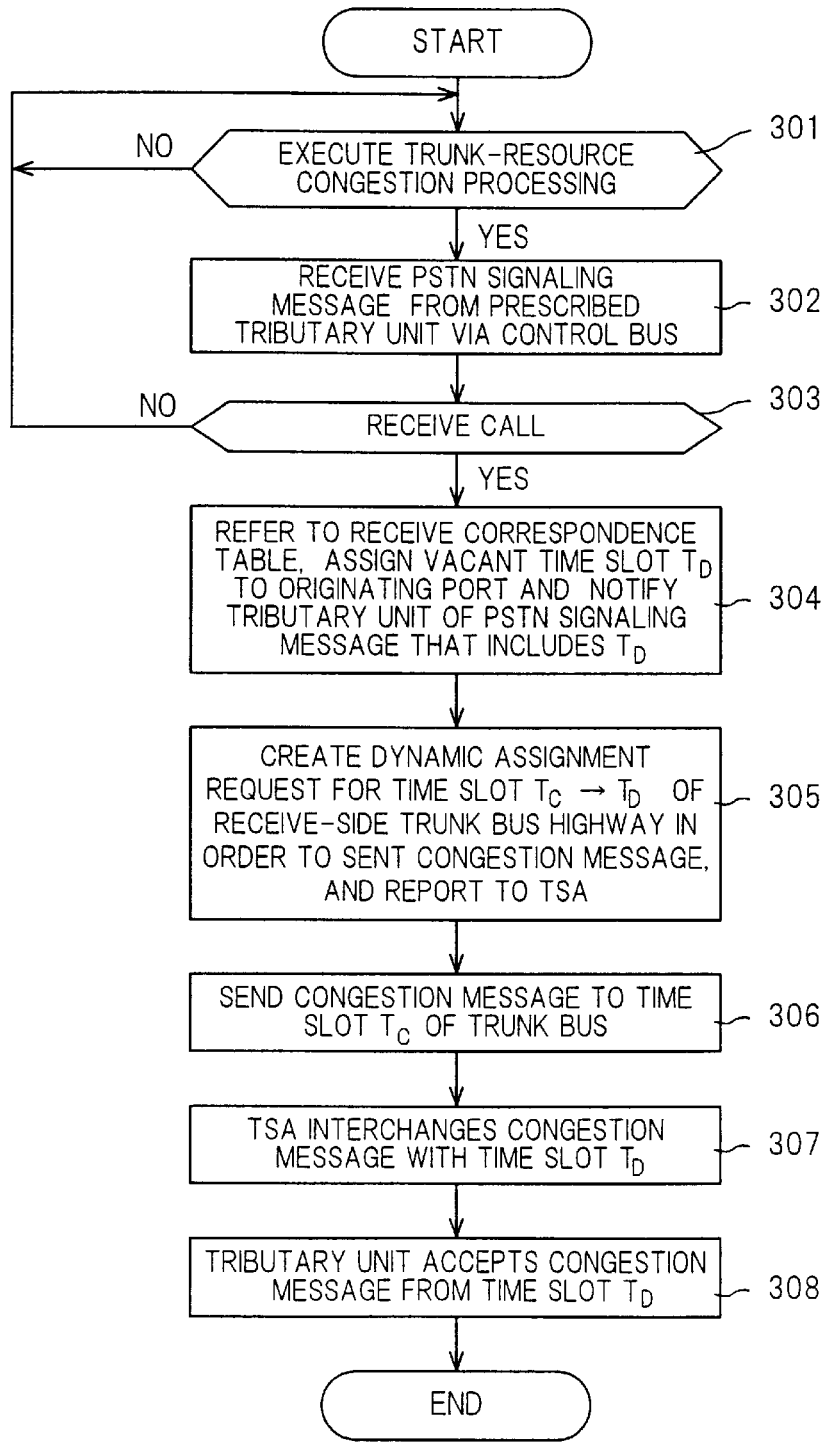
FIG. 16 is a flowchart of congestion processing executed by the V5 message controller.

FIG. 16 is a flowchart of congestion processing executed by the V5 message controller 7a.

The V5 message controller 7a refers to the transmit correspondence table STP to determine whether a vacant time slot exists (step 301). If a vacant time slot exists, this means that the trunk resources are not in the congested state. If a vacant time slot does not exist, however, this indicates congestion of trunk resources.

In case of congestion, the V5 message controller 7a determines whether a PSTN signaling message received from a prescribed tributary unit via the control bus 15 is requesting origination of a call (steps 302–303). If call origination is being requested, the V5 message controller 7a refers to the receive correspondence table RTP to obtain a vacant time slot $T_D$ and then assigns this time slot to the port that is the source of the originate request. Further, the V5 message controller 7a reports this time slot $T_D$ to the tributary unit, to which the port that is the source of the originate request belongs, via the control bus 15 by means of a PSTN signaling message (step 304).

Next, the V5 message controller 7a creates a dynamic assignment request for cross-connecting, to time slot $T_D$ of the receive tributary bus, a prescribed time slot $T_C$ of the receive trunk bus determined in advance in order to send a congestion message, and reports this request to the time-slot assignment unit 2a (step 305). Thereafter, the V5 message controller 7a sends the congestion message to the receive trunk bus at the timing of the time slot $T_C$ (step 306).

The time-slot assignment unit 2a interchanges the congestion message of time slot $T_C$ in the receive trunk bus with the time slot $T_D$ of the receive tributary bus (step 307). The tributary unit accepts the congestion message from the receive tributary bus at the timing of the time slot $T_D$ and reports this message to the terminal that is requesting call origination (step 308).

Figure 17:
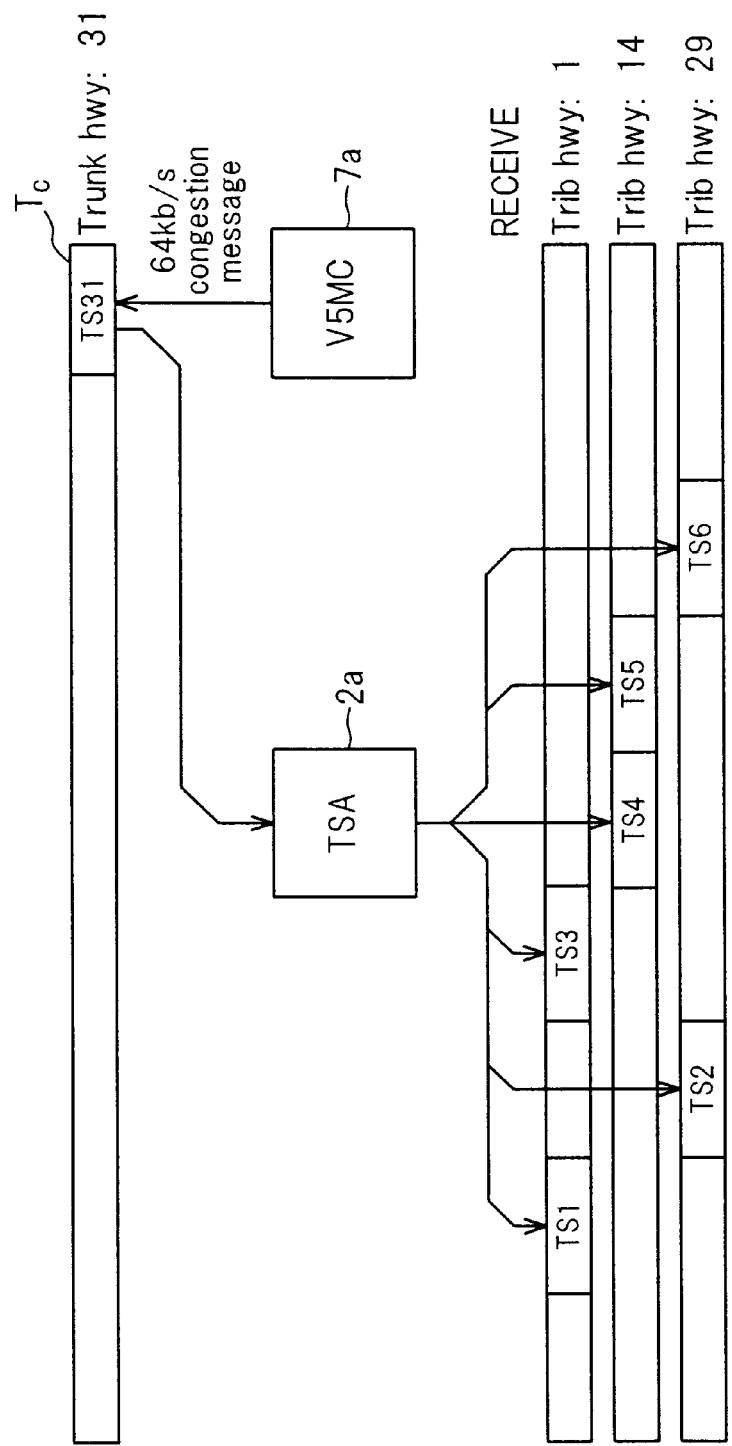
FIG. 17 is a diagram useful in describing transmission/reception of a congestion message.
Figure 18:
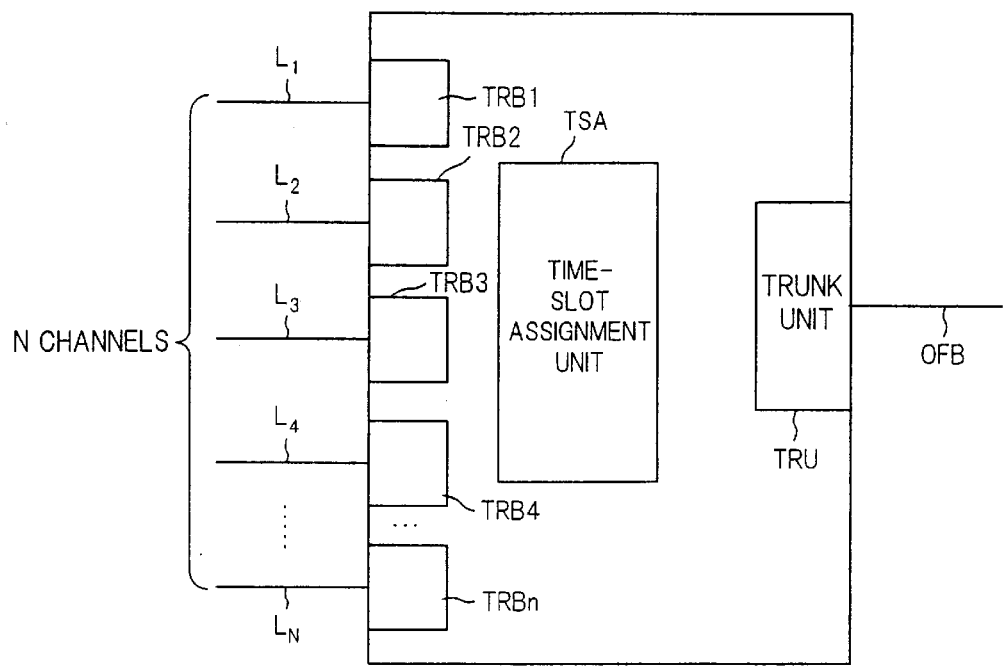
FIG. 18 is a diagram showing the structure of a time-division multiplexer according to the prior art.
Figure 19:
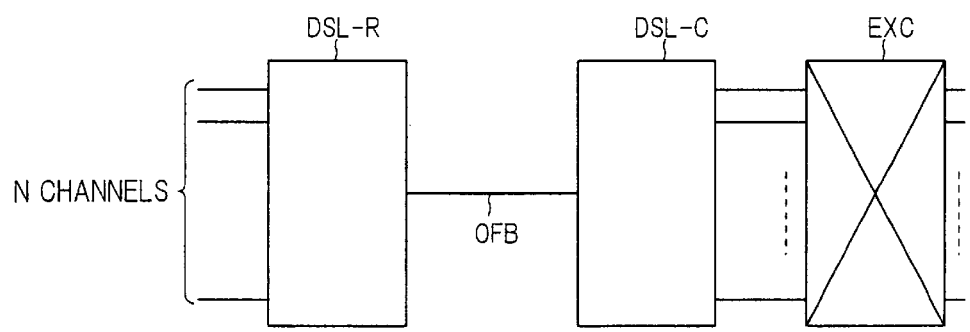
FIG. 19 is a diagram showing a network configuration in which a time-division multiplexer is used as digital subscriber line (DSL) equipment according to the prior art.
Figure 20:
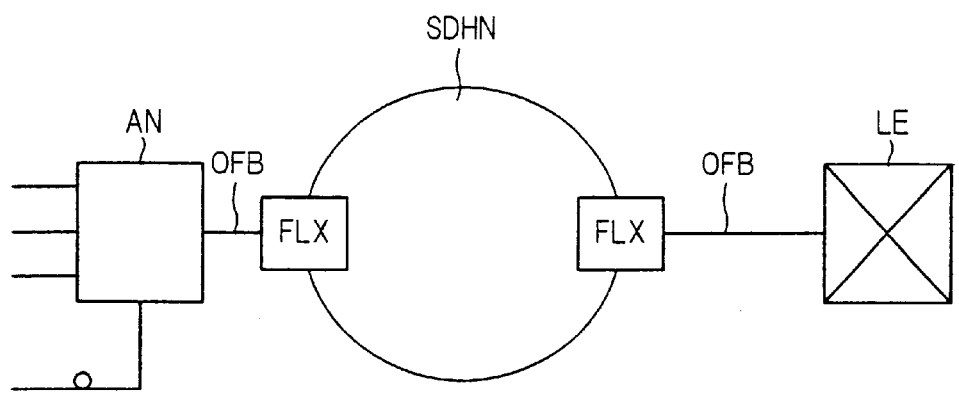
FIG. 20 is a diagram useful in describing a mode in which a time-division multiplexer is utilized as an access network unit which accesses an SDH network according to the prior art.
Figure 21:
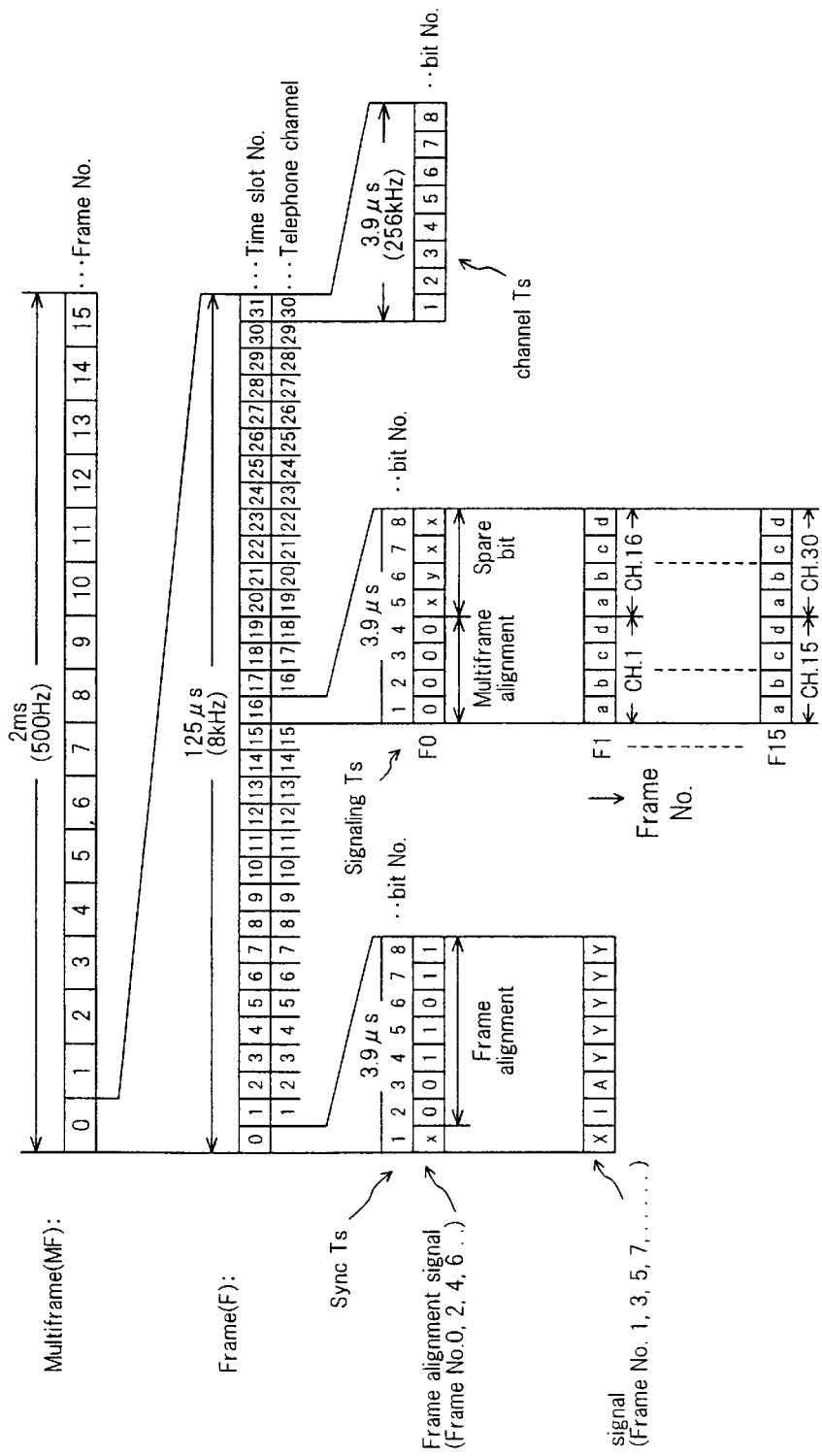
FIG. 21 is a diagram showing the structure of a frame according to the prior art.

FIG. 17 shows an example in which (1) time slot TS31 of highway hwy31 of receive trunk bus 11a is adopted as the time slot $T_C$ for transmitting the congestion message, and (2) the congestion message is broadcast to time slots TS1, TS3 of highway hwy1, time slots TS4, TS5 of highway hwy14 and time slots TS2, TS6 of highway hwy29 of the receive tributary bus. The V5 message controller 7a sends the time-slot assignment unit 2a a dynamic assignment request for the purpose of broadcasting the congestion message and thenceforth sends the receive trunk bus 11a the congestion message at the timing of time slot TS31 of highway hwy31. On the basis of the dynamic assignment request, the time-slot assignment unit 2a broadcasts the congestion message to the designated time slot of the receive tributary bus.

(E) Additional remarks

The characterizing features of the present invention, described in detail above, are as follows:

1. The invention provides a time-division multiplexer comprising a set of circuit units internally connected by the three buses 11, 12, 15 and mounted at right angles on a back wiring board.

2. The trunk bus 11 provides for the exchange time-division multiplexed data and channel-associated signaling messages (CAS messages) between one or more trunk units and the time-slot assignment unit 2a. In this case,
   (1) the trunk bus 11 is constructed from a set of parallel signal tracks 11a –11d on a back wiring board accessible at all circuit unit positions;
   (2) the trunk bus 11 supports one or more highways for the transport of data and signaling messages;
   (3) each highway consists of 32 time slots; and
   (4) multiple highways are time-interleaved.

3. The tributary bus 12 provides for the exchange of time-division multiplexed data and CAS messages between one or more tributary units 3–6 and the time-slot assignment unit 2a. In this case,
   (1) the tributary bus 12 is constructed from a set of parallel signal tracks 12a –12d on the back wiring board accessible at all circuit unit positions;
   (2) the trunk bus 12 supports one or more highways for the transport of data and signaling messages;
   (3) each highway consists of 32 time slots; and
   (4) multiple highways are time-interleaved.

4. The control bus 15 provides for the exchange of control signals and alarm signals, etc., between all units and the main processor unit 8. In this case,
   (1) the control bus 15 is formed on the back wiring board so as to be accessible at all circuit unit positions;
   (2) the control bus 15 supports a multiple-access protocol that is capable of accessing each unit; and
   (3) the address of each unit is set by a fixed binary pattern obtained from the back wiring board.

5. The control bus 15 provides for the exchange of common channel signaling messages between the tributary units 3–6 and common channel controller (V5 message controller) 7a.

6. The trunk unit 1a interfaces the high-bit-rate trunks 13a, 14a and the trunk bus 11. In this case,
   (1) the trunk unit 1a extracts the time-division multiplexed data from a high-bit-rate digital signal and outputs the data to the receive trunk bus 11a;
   (2) the trunk unit 1a extracts CAS messages from a high-bit-rate digital signal;
   (3) the trunk unit 1a converts time-division multiplexed data from the receive trunk bus 11a to a high-bit-rate digital signal;
   (4) the trunk unit 1a inserts a CAS message from the transmit trunk bus 11b into a high-bit-rate digital signal; and
   (5) the trunk unit 1a accesses one or more trunk bus highways.

7. The tributary units perform processing for interfacing the tributary bus 12 and customer service interfaces. In this case,
   (1) the tributary units extract time-division multiplexed data from the receive tributary bus 12a and format this data so that the data will be compatible with the customer interface;
   (2) the tributary units extract a CAS message from the receive tributary bus 12a and activate the appropriate customer line;
   (3) the tributary units format the customer interface data as time-division multiplexed data for insertion into the transmit tributary bus 12b;
   (4) the tributary units process the customer-line state in order to insert a CAS message into the transmit tributary bus 12b; and
   (5) the tributary units access one or more time slots in a tributary highway.

8. The time-slot interchange unit provides for the interchange of time-slots between the trunk and tributary busses 11, 12, wherein;
   (1) the data and signaling are interchanged as one entity between both busses;
   (2) the mapping between trunk and tributary time-slots numbers in applied as in both directions of transmission and
   (3) the synchronization of the trunk bus 11 and tributary bus 12 is set by the time-slot interchange unit.

In accordance with the present invention, it is unnecessary to assign time slots to subscribers in static fashion. Communication can be carried out by assigning vacant time slots to subscribers dynamically and subscribers can be accommodated beyond the capacity of the transmission line.

Further, in accordance with the present invention, control for interchanging time slots can be performed in a short period of time and upgrading can be facilitated.

Further, in accordance with the present invention, trunk units and tributary units can be inserted at any positions on a BWB because time slots are assigned dynamically.

Further, in accordance with the present invention, service can be enhanced by notifying subscribers of the congested state of the time-division multiplexer.

As many apparently widely different embodiments of the present invention can be made without departing from the spirit and scope thereof, it is to be understood that the invention is not limited to the specific embodiments thereof except as defined in the appended claims.

What is claimed is:

1. A time-division multiplexer for demultiplexing, into individual time slots, time-division multiplexed data in a receive direction received via from a network via a trunk unit, and sending the demultiplexed data to a prescribed tributary unit, and for multiplexing, to a prescribed time slot, data in a transmit direction which enters from tributary units and sending the multiplexed data to the network via the trunk unit, said time-division multiplexer comprising:

a trunk bus which has a receive trunk bus in the receive direction and a transmit trunk bus in the transmit direction, each trunk bus being connected to the trunk unit;

a tributary bus which has a receive tributary bus in the receive direction and a transmit tributary bus in the transmit direction each tributary bus being connected to the tributary units;

a time-slot interchange unit which interchanges time slots of the receive trunk bus and time slots of the receive tributary bus in the receive direction and interchanges time slots of the transmit tributary bus and time slots of the transmit trunk bus in the transmit direction;

a common channel signaling controller for executing control for dynamic assignment of time slots on the trunk side and time slots on the tributary side based upon a common channel signaling message, and sending said time-slot interchange unit a request to interchange the assigned time slots; and a control bus through which the units communicate with one another;

wherein in the receive direction, said common channel signaling controller obtains a vacant time slot of the receive tributary bus and adopts this time slot as a time slot $T_B$ on the tributary side; sends a request for interchange of a time slot $T_A$ on the trunk side and the time slot $T_B$ on the tributary side to said time-slot interchange unit via the control bus; and notifies a tributary unit of the time slot $T_B$ on the tributary side via the control bus;

said time-slot interchange unit interchanges data in the time slot $T_A$ on the trunk side with that in the time slot $T_B$ on the tributary side based upon the timeslot interchange request; and the tributary unit accepts data from the receive tributary bus at the timing of the notified time slot $T_B$.

2. The time-division multiplexer according to claim 1, wherein said common channel signaling controller receives a common channel signaling message from said time-slot interchange unit via said tributary bus and executes control for dynamic assignment of time slots based upon this common channel signaling message.

3. The time-division multiplexer according to claim 1, wherein said common channel signaling controller has a table for managing status of use time slots of the receive tributary bus.

4. A time-division multiplexer for demultiplexing, into individual time slots, time-division multiplexed data in a receive direction received via from a network via a trunk unit, and sending the demultiplexed data to a prescribed tributary unit, and for multiplexing, to a prescribed time slot, data in a transmit direction which enters from tributary units and sending the multiplexed data to the network via the trunk unit, said time-division multiplexer comprising:

a trunk bus which has a receive trunk bus in the receive direction and a transmit trunk bus in the transmit direction, each trunk bus being connected to the trunk unit;

a tributary bus which has a receive tributary bus in the receive direction and a transmit tributary bus in the transmit direction, each tributary bus being connected to the tributary units;

a time-slot interchange unit which interchanges time slots of the receive trunk bus and time slots of the receive tributary bus in the receive direction and interchanges time slots of the transmit tributary bus and time slots of the transmit trunk bus in the transmit direction;

a common channel signaling controller for executing control for dynamic assignment of time slots on the trunk side and time slots on the tributary side based upon a common channel signaling message, and sending said time-slot interchange unit a request to interchange the assigned time slots; and a control bus through which the units communicate with one another;

wherein in the transmit direction, said common channel signaling controller obtains a vacant time slot-of the transmit tributary bus and adopts this time slot as a time slot $T_A'$ on the tributary side; sends a request for interchange of the time slot $T_A'$ on the tributary side and a time slot $T_B'$ on the trunk side to said time-slot interchange unit via the control bus; and notifies a tributary unit of the time slot $T_A'$ on the tributary side via the control bus;

said time-slot interchange unit interchanges the data in the time slot $T_A'$ on the tributary side with that in the time slot $T_B'$ on the trunk side based upon the time-slot interchange request; and the tributary unit sends data to the transmit tributary bus at the timing of the notified time slot $T_A'$.

5. The time-division multiplexer according to claim 4, wherein said common channel signaling controller receives a common channel signaling message from a tributary unit via said control bus and executes control for dynamic assignment of time slots based upon this common channel signaling message.

6. The time-division multiplexer according to claim 4, wherein said common channel signaling controller has a table for managing status of use of time slots of the transmit tributary bus.

7. A time-division multiplexer for demultiplexing, into individual time slots, time-division multiplexed data in a receive direction received via from a network via a trunk unit, and sending the demultiplexed data to a prescribed tributary unit, and for multiplexing, to a prescribed time slot, data in a transmit direction which enters from tributary units and sending the multiplexed data to the network via the trunk unit, said time-division multiplexer comprising:

a trunk bus which has a receive trunk bus in the receive direction and a transmit trunk bus in the transmit direction, each trunk bus being connected to the trunk unit;

a tributary bus which has a receive tributary bus in the receive direction and a transmit tributary bus in the transmit direction, each tributary bus being connected to the tributary units;

a time-slot interchange unit which interchanges time slots of the receive trunk bus and time slots of the receive tributary bus in the receive direction and interchanges time slots of the transmit tributary bus and time slots of the transmit trunk bus in the transmit direction;

a common channel signaling controller for executing control for dynamic assignment of time slots on the trunk side and time slots on the tributary side based upon a common channel signaling message, and sending said time-slot interchange unit a request to interchange the assigned time slots; and wherein said common channel signaling controller assigns a vacant time slot $T_D$ of the receive tributary bus to a call generated at the time of congestion; sends said time-slot interchange unit a dynamic interchange request for interchanging a congestion-message transmit time slot $T_C$ and the time slot $T_B$; and notifies a tributary unit of the time slot $T_B$ on the tributary side;

said time-slot interchange unit interchanges a congestion message in the time slot $T_C$ on the trunk side with the time slot $T_B$ on the tributary side based upon the interchange request; and the tributary unit accepts the congestion message from the receive tributary bus at the timing of the notified time slot $T_D$.

* * * * *